(12) United States Patent
Nakatani et al.

(10) Patent No.: US 7,123,818 B2
(45) Date of Patent: Oct. 17, 2006

(54) DIGITAL VIDEO RECORDING APPARATUS AND METHOD

(75) Inventors: Tokuo Nakatani, Katano (JP); Hideki Fukuda, Nara (JP); Kazuhiko Nakamura, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1148 days.

(21) Appl. No.: 09/891,174

(22) Filed: Jun. 26, 2001

(65) Prior Publication Data

US 2002/0051623 A1 May 2, 2002

(30) Foreign Application Priority Data

Jun. 26, 2000 (JP) .............................. 2000-190889

(51) Int. Cl.
*H04N 5/91* (2006.01)

(52) U.S. Cl. .......................................... 386/97; 386/94
(58) Field of Classification Search ................ 358/908; 386/46, 47, 8; 380/4; 348/533, 553
See application file for complete search history.

(56) References Cited

U.S. PATENT DOCUMENTS

| | | | | |
|---|---|---|---|---|
| 5,574,787 A | * | 11/1996 | Ryan ........................... | 380/201 |
| 5,692,093 A | * | 11/1997 | Iggulden et al. .............. | 386/46 |
| 5,729,516 A | | 3/1998 | Tozaki et al. | |
| 6,078,727 A | | 6/2000 | Saeki et al. | |
| 6,160,950 A | | 12/2000 | Shimazaki et al. | |
| 6,208,800 B1 | * | 3/2001 | Katsuyama et al. .......... | 386/83 |
| 6,212,330 B1 | | 4/2001 | Yamamoto et al. | |
| 6,449,021 B1 | | 9/2002 | Ohta et al. | |
| 6,937,658 B1 | * | 8/2005 | Suito et al. ............ | 375/240.15 |

FOREIGN PATENT DOCUMENTS

| | | |
|---|---|---|
| DE | 198 28 072 A1 | 12/1999 |
| EP | 0 735 754 A2 | 10/1996 |
| EP | 860 829 | 8/1998 |
| EP | 0 903 743 | 3/1999 |
| EP | 965 991 | 12/1999 |
| EP | 1 085 513 | 3/2001 |
| JP | 9-245438 | 9/1997 |
| JP | 9-259542 | 10/1997 |
| JP | 10-32776 | 2/1998 |
| JP | 10-234002 | 9/1998 |
| JP | 11-96730 | 4/1999 |
| JP | 11-126463 | 5/1999 |
| JP | 11-155130 | 6/1999 |
| JP | 11-317058 | 11/1999 |
| JP | 2000-4421 | 1/2000 |
| JP | 2000-57749 | 2/2000 |
| JP | 2000-69414 | 3/2000 |
| JP | 2000-78519 | 3/2000 |
| JP | 2000069414 A * | 3/2000 |
| JP | 2000-165796 | 6/2000 |
| WO | 01/35409 A2 | 5/2001 |

\* cited by examiner

*Primary Examiner*—Thai Tran
*Assistant Examiner*—Mishawn Dunn
(74) *Attorney, Agent, or Firm*—Wenderoth, Lind & Ponack, L.L.P.

(57) ABSTRACT

A video data recording apparatus detects a change in an attribute of a signal input with video data, generates management information showing a position in which the change was detected, and records the management information to a recording medium. The video data playback apparatus reads and plays back the video data up to the position shown in the management information recorded on the recording medium.

14 Claims, 26 Drawing Sheets

DIGITAL VIDEO RECORDING APPARATUS AND METHOD

BACKGROUND OF THE INVENTION (1) Field of the Invention

The present invention relates to a digital video recording apparatus and a method for recording audio and to video signals to a recording medium digitally.

(2) Description of the Related Art

Conventionally, when using a function of digital video recording apparatuses which stops recording of commercials (hereinafter "commercial cut recording"), a time lag occurs between recording and until recording actually stops, meaning that sound and images are recorded during this time lag.

The following is an explanation of a digital video recording apparatus that records and plays backs broadcasts.

FIG. 1 is a function block diagram of a digital video recording apparatus.

In the figure, a digital video recording apparatus 10 is composed of a user interface unit 11, an input unit 12, an output unit 13, a detection unit 14, an encoder unit 15, a decoder unit 16, a storage unit 17, and a system control unit 18.

The user interface unit 11 receives requests from the user to record, play back, and so on, and sends the requests to the system control unit 18. Specifically, the user interface unit 11 is an input device such as keys and an output device such as a display panel.

The input unit 12 converts sound and video signals into frame data (field data) using an A/D converter. These signals (hereinafter "audio/video signals") are included in a signal input through an external input terminal such as an antenna terminal and a tuner (not illustrated) or an audio/video input terminal. The input unit 12 sends the converted signals to the encoder unit 15.

The output unit 13 receives frame data (field data) from the decoder unit 16, and converts the frame data into an audio/video signal using a D/A converter. Then, the output unit 13 outputs the audio/video signal to a monitor (not illustrated) through an external output terminal such as an audio/video output terminal.

The detection unit 14 monitors the audio mode signal included in the signal input into the input unit 12 and notifies the system control unit 18 if the attributes of the audio mode signal change.

Here, the audio mode signal is a signal distinguishing whether the sound is monaural or stereo. The attributes of the audio mode changing refers to the audio mode signal changing from monaural to stereo, or from stereo to monaural.

The encoder unit 15 starts encoding on receiving an instruction from the system control unit 18 to start encoding (hereinafter "encode start instruction"), and stops encoding on receiving an instruction to stop encoding (hereinafter "encode stop instruction")

Here, encoding refers to a procedure for generating data in an MPEG (Moving Picture Experts Group) program stream format by encoding frame data (field data) sent from the input unit 12. This generated data will be referred to as a "VOB" (Video Object) hereinafter. Note that the encoder unit 15 sends the generated VOB to the storage unit 17.

The decoder unit 16 starts decoding on receiving an instruction to start decoding (hereinafter "decode start instruction") from the system control unit 18, and stops decoding on receiving an instruction to stop decoding (hereinafter "decode stop instruction").

Here, decoding refers to a procedure for decoding and making a VOB sent from the storage unit 17 back into frame data (field data). Note that the decoder unit 16 sends the decoded frame data (field data) to the output unit 13.

The storage unit 17 writes the VOB received from the encoder unit 15 to a recording medium on receiving an instruction to write (hereinafter "write instruction") from the system control unit 18, and reads a VOB from a recording medium on receiving an instruction to read (hereinafter "read instruction") from the system control unit 18. Note that the storage unit 17 sends the read VOB to the decoder unit 16.

Here, the recording medium refers to a medium that such as a DVD-RAM (Digital Versatile Disk Random Access Memory) or an HD (Hard Disk).

Note that a DVD-RAM uses ZCLV (Zone Constant Linear Velocity) physical format, and a UDF (Universal Disk Format) logical format.

The system control unit 18 controls the encoder unit 15, the decoder unit 16, and the storage unit 17. Specifically, the system control unit 18 controls encoding by giving encode start instructions and encode stop instructions to the encoder unit 15, and decoding by giving decode start instructions and decode stop instructions to the decoder unit 16. Furthermore, the system control unit 18 controls reading and writing of VOBs by giving write instructions and read instructions to the storage unit 17.

In addition, the system control unit 18 records on receiving a request from the user interface unit 11 to start recording, and plays back on receiving a request from the user interface unit 11 to play back.

Here, recording refers to the system control unit 18 giving an encoding start instruction to the encoder unit 15 and having the encoder unit 15 encode, and giving a write instruction to the storage unit 17 and having the storage unit 17 write the VOB generated by the encoding.

Here, playback refers to the system control unit 18 giving a read instruction to the storage unit 17 and having the storage unit 17 read a stored VOB, and giving a decode start instruction to the decoder unit 16 and having the decode unit 16 decode the read VOB.

Note that the system control unit 18 is a function realized by hardware such as a microcomputer, a RAM (Random Access Memory), and a ROM (Read Only Memory), and software such as a system control software.

<How Time Lag Occurs>

The following explains how time lag occurs in the digital video recording apparatus 10 having the above-described structure, using commercial cut recording as an example.

Note that commercial cut recording makes use of the switch in the attributes of the audio mode signal included in an input signal. That is, the audio mode signal switches from monaural to stereo when a broadcast proceeds from a program to a commercial, and from stereo back to monaural when the program starts again.

<Commercial Cut Recording>

FIG. 2 shows a commercial cut recording sequence.

As can be seem from the diagram, detection unit 14 monitors the attributes of the audio mode signal included in an input signal, and detects a switch in the attributes from monaural to stereo (step S21). Note that the detection unit 14 monitors the attributes continuously.

Here, the detection takes 0.5 frames (16 msec).

Then, the detection unit 14 judges that the program has stopped and a commercial has started (step S22), and notifies the system control unit 18 that the commercial has started (step S23).

Here, the judgement takes 1 frame (32 msec). This is because the attributes of the audio mode signal equal to one frame are monitored from when the switch is detected until the signal is confirmed to be stereo.

The system control unit 18 receives notification from the detection unit 14 that the CM has started (step S24), and gives an encode stop instruction to the encoder unit 15 (step S25).

Here, the system control unit 18 takes 0.5 frames (16 msec) from when it receives the notification to when it gives the encode stop instruction.

The encoder unit 15 receives the encode stop instruction from the system control unit 18 (step S26) and stops encoding (step S27).

Here, the encoder unit 15 takes 3 frames (96 msecs) from when it receives the encode stop instruction to when it actually stops encoding. This is because it takes an amount of time equal to 3 frames to mute the audio.

This completes the explanation of the sequence that takes place until recording stops. Next, the sequence from recording to playback will be explained.

The detection unit 14 detects a switch from stereo to monaural in the attribute of the audio mode signal (step S28).

Here, the detection takes 0.5 frames (16 msec).

Then, the detection unit 14 judges that the commercial has stopped and the program has started (step S29), and notifies the system control unit 18 that the program has started (step S30).

Here, the judgement takes 1 frame (32 msec). This is because the attributes of the audio mode signal equal to one frame are monitored from when the switch is detected until the signal is confirmed to be monaural.

The system control unit 18 receives notification from the detection unit 14 that the commercial has finished (step S31), and gives an encode start instruction to the encoder unit 15 (step S32).

Here, it takes the system control unit 16 0.5 frames (16 msec) from when it receives notification to give the encode start instruction.

The encoder unit 15 receives the encode start instruction from the system control unit 18 (step S33) and starts encoding (step S34).

In this way, the digital video recording apparatus 10 has a time lag of 5 frames until it stops recording, and 2 frames before it starts recording. Sound and video of the 5 frames until recording actually stops are recorded.

Naturally, time lag varies according to the manufacturer, model, and processing contents of the video recording apparatus.

Note that when there is a copyright protection function the sequence varies from the above-described sequence in that the detection unit 14 monitors the attributes of the copy protect signal, and detects switches in the attributes of the copy protect signal from copy free to copy prohibit. In such a case it is the detection of the switch in attributes of the copy protect signal, rather than the switch in the attributes of the audio mode signal, that takes time.

However, as explained above, a problem arises that when a broadcast that has been recorded using the commercial cut recording is played back, the 5 frames of the commercial that were recorded are also played back.

In other words, the problem is that when commercial cut recording or copyright protection functions are used, frames of sound and video that the user does not wish to play back are played back due to time lag unique to digital video recording apparatuses.

Furthermore, in commercial cut recording in analog video tape recorders (hereinafter "VTR(s)"), a technique is used in which the tape is rewound an amount equivalent to the time lag when recording stops, and this portion of the tape is overwritten (deleted) when recording restarts. This means that effectively video signal equivalent to the time lag is not recorded. It is possible to apply this technique to digital video recording apparatuses and delete the end portion of the VOB equivalent to the time lag, but the processing load would be large, meaning that this technique cannot be easily realized. This is because a VOB is recorded in GOP units in which I, P, and B pictures are mixed. Therefore, it would be necessary for the decoder unit 16 to decode the frame data (field data) into the GOP which includes the end portion, and the encoder unit 15 delete the decoded frame data (field data) which includes the end portion, and re-encode the remaining data. This is a heavy processing load for the system control unit 18 to control. In addition, it is possible that the procedure may not finish in time for recording to restart if the time available for deletion is too short.

SUMMARY OF THE INVENTION

In view of the above-described problems, the object of the present invention is to provide a digital video recording apparatus and method in which unnecessary audio and video is not played back when using a commercial cut function or copyright protection function, and in which the processing load is small.

The video data recording apparatus of the present invention includes a detection unit operable to detect a change in an attribute of input video data; a recording unit operable to record the video data to a recording medium; a generating unit operable to generate playback control information which shows a position in the video data at which the change in the attribute was detected; and a control unit operable to control the recording unit so that the recording unit records the playback control information to the recording medium.

According to this construction, the video data recording apparatus records video data and playback control information showing the detection position to the recording medium, and the video data playback apparatus, based on the playback control information, plays back the video data up to the detection position of change in the attribute. This means that it is possible to avoid playing back unnecessary portions of the video data.

In addition, the video data recording apparatus decodes and encodes together with detecting changes in the attribute, and generates playback control information without deleting the unnecessary portions, and without making the processing load heavy. This means that it is possible to avoid playing back unnecessary portions of the video data.

As a result, the load of the recording process can be suppressed, and the recording process can continue in real time.

In addition, the detection unit detects a change in the attribute of the input video data from a first attribute to a second attribute and from the second attribute to the first attribute; and the first attribute and the second attribute are defined as one of (a) the first attribute being one of (i) stereo, (ii) monaural, and (iii) multiplex audio data, and the second attribute being one of (i), (ii), and (iii) and being different than the first attribute, and (b) the first attribute permitting copying video data to which a copy protect signal is attached, and the second attribute prohibiting copying of video data to which a copy protect signal is attached.

According to this construction, the video data recording apparatus (a) detects the start position of a commercial which is included in input video data, by detecting a change in the audio data, and (b) detects video included in the input video data that is copyright protected, by detecting a change in the copy protect signal. In addition, the video data recording records the detected position in the recording medium as playback control information, in the case of both (a) and (b). This means that the video data playback apparatus can avoid playing back commercials and copyright protected video.

Here, the playback control information indicates to a video data playback apparatus a playback start point and a playback end point of the video data, and the generating unit further generates the playback control information so that the detection position of the change in the attribute from the first attribute to the second attribute is the playback end point.

According to this construction, the video data playback apparatus plays back video data, based on the playback control information, from the playback start point to the playback end point, making playback to the detection position of the change from the first attribute to the second attribute possible.

The video data recording apparatus also includes a retaining unit operable to retain lag data which shows a lag time including an amount of time required for the detection unit to detect the change in the attribute and an amount of time required from when the detection unit detects the change in the attribute until the recording unit stops recording.

Here, the recording unit stops recording when the detection unit detects the change from the first attribute to the second attribute, and the generating unit makes a head of the video data of which recording has stopped the playback start point, and a time which is the lag time subtracted from an end time of the video data of which recording has stopped, the playback end point.

According to this construction, the video data recording apparatus moves back to the position at which it detected the playback end point, making it possible to prevent the video data playback apparatus from playing back a commercial or copyright protected video recorded during the lag time.

In addition, the recording unit starts recording new video data when the detection unit detects the change in the attribute from the second attribute to the first attribute.

According to this construction, it is possible for the video data recording apparatus to have the video data playback apparatus play back or not play back each unit of video data, by recording new video data each time a change in the attribute is detected.

Furthermore, the video data recording apparatus includes a retaining unit operable to retain lag data which shows a lag time including an amount of time required for the detection unit to detect the change in the attribute.

Here, the recording unit continues to record video data after the detection unit detects the change in the attribute, and the generating unit makes one of (a) a head of the video data and (b) a detection position where the attribute changes from the second attribute to the first attribute, the playback start point, and, when the change in the attribute is detected by the detection unit, makes a time which is the lag time subtracted from the end time of the video data of which recording has stopped, the playback end point.

According to this construction, the video data recording apparatus does not delete the commercial, but rather goes back to the position where the start point and the end point were detected. This means that during playback the video data recording apparatus can have the video data playback apparatus not play back (in other words skip) the commercial and copyright protected video.

The video data playback apparatus of the present invention includes a reading unit operable to read playback control information and video data from a recording medium, the playback control information showing a position in the video data at which a change in an attribute occurs; a playback unit operable to play back the read video data; and a control unit operable to control the reading unit so that the reading unit reads from the head of the video data to the position at which the change in the attribute occurs, according to the read playback control information.

Here, the playback control information shows the position in the video data where the attribute changes. This means that the video data playback apparatus specifies the start and end positions of video data to be played back using the detection positions of changes of the attribute of the video data. As a result, playback of unnecessary portions is prevented.

The change in the attribute is a change in the video data from a first attribute to a second attribute; and the first attribute and the second attribute are defined as one of (a) and (b), in (a) the first attribute being one of (i) stereo, (ii) monaural, and (iii) multiplex audio data, and the second attribute being one of (i), (ii), and (iii) and being different than the first attribute, and in (b) the first attribute permitting copying, and the second attribute prohibiting copying.

This means that playback of a commercial and copyright protected video is prevented.

A recording medium for recording video data in the video data recording medium of the present invention has recorded thereon playback control information showing a position in the video data at which a change in an attribute of the video data occurs.

The change is a change in the video data from a first attribute to a second attribute; and the first attribute and the second attribute are defined as one of (a) and (b), in (a) the first attribute being one of (i) stereo, (ii) monaural, and (iii) multiplex audio data, and the second attribute being one of (i), (ii), and (iii) and being different than the first attribute, and in (b) the first attribute permitting copying, and the second attribute prohibiting copying.

This means it is possible to prevent the video data playback apparatus which plays back from the recording medium from playing back a commercial and copyright protected video.

The recording method of the present invention for video data includes a first recording step for recording input video data successively to a recording medium; a detection step for detecting a change in an attribute of the video data; a generating step for generating playback control information which shows a position in the video data at which the change in the attribute was detected; and a second recording step for recording the playback control information in correspondence with the video data, to the recording medium.

According to this, the video data recording apparatus records video data and playback control information showing the detection position in the recording in medium. As a result, the video data playback apparatus plays back to the position in the video data at which the change in the attribute was detected, meaning that it is possible to not play back an unnecessary portion included in the video data.

Furthermore, the video data recording apparatus decodes and encodes together with detecting changes in the attribute, and generates playback control information without deleting the unnecessary portions, and without making a heavy processing load. This means that it is possible to avoid playing back unnecessary portions of the video data.

As a result, the load on the recording process can be suppressed, while the recording process can continue in real time.

The playback method of the present invention for playing back video data includes a first reading step for reading playback control information from a recording medium, the playback control information showing a position in the video data of a change in an attribute; a specification step for specifying, according to the read playback control information, a playback segment from the head of the video data to the position in the video data of the change in the attribute; a second reading step for reading video data which corresponds to the specified playback segment, from the recording medium; and a playback step for playing back the read video data.

According to this, the video data playback apparatus specifies the start point and the end point from the position at which the change in the attribute of the video data was detected, and it is possible to prevent the video data playback apparatus from playing back an unnecessary portion.

A program recording medium having recorded thereon a program for recording video data to a video recording medium, and being readable by a video data recording apparatus which has a detection unit for detecting a change in an attribute of input video data, and a recording unit for recording video data to the video recording medium, the program including a generating program segment for generating playback control information which shows a position in the video data at which the change in the attribute was detected; and a control program segment for controlling the recording unit so that the recording unit records the playback control information to the recording medium.

According to this structure, a video data recording apparatus which executes the program recorded on the program recording medium records video data and playback control information showing the detection position to the recording medium, and the video data playback apparatus, based on the playback control information, plays back the video data up to the detection position where the attribute changes. This means that it is possible to avoid playing back unnecessary portions of the video data.

In addition, the video data recording apparatus decodes and encodes together with detecting changes in the attribute, and generates playback control information without deleting the unnecessary portions, and without making a heavy processing load. This means that it is possible to avoid playing back unnecessary portions of the video data.

As a result, the load on the recording process can be suppressed, while the recording process can continue in real time.

A program recording medium having a program recorded thereon for playing back video data recorded in a video recording medium, and being readable by a video data playback apparatus which has a reading unit for reading video data from the video recording medium, the program realizing on a computer a first reading step for reading playback control information from a recording medium, the playback control information showing a position in the video data of a change in an attribute; a specification step for specifying, according to the read playback control information, a playback segment from the head of the video data to the position in the video data of the change in the attribute; a second reading step for reading video data which corresponds to the specified playback segment, from the recording medium; and a playback step for playing back the read video data.

According to this, the video data playback apparatus which executes the program recorded on the program recording medium specifies the start point and the end point from the position at which the change in the attribute of the video data was detected, and it is possible to prevent the video data playback apparatus from playing back an unnecessary portion.

A program executable by a computer in a video data recording apparatus which has a detection unit for detecting a change in an attribute of input video data, and a recording unit for recording the video data to the video recording medium, the program including a generating program segment for generating playback control information which shows a position in the video data at which the change in the attribute was detected; and a control program segment for controlling the recording unit so that the recording unit records the playback control information to the recording medium.

According to this, the video data recording apparatus which executes the program records video data and playback control information showing the detection position to the recording medium, and the video data playback apparatus, based on the playback control information, plays back the video data up to the detection position where the attribute changes. This means that it is possible to avoid playing back unnecessary portions of the video data.

In addition, the video data recording apparatus decodes and encodes together with detecting changes in the attribute, and generates playback control information without deleting the unnecessary portions, and without making the processing load heavy. This means that it is possible to avoid playing back unnecessary portions of the video data.

As a result, the load on the recording process can be suppressed, while the recording process can continue in real time.

A program executable by a computer in a video data playback apparatus which has a reading unit for reading video data from a video recording medium, the program realizing on the computer a first reading step for reading playback control information from a recording medium, the playback control information showing a position in the video data of a change in an attribute; a specification step for specifying, according to the read playback control information, a playback segment from the head of the video data to the position in the video data of the change in the attribute; a second reading step for reading video data which corresponds to the specified playback segment, from the recording medium; and a playback step for playing back the read video data.

According to this, the video data playback apparatus which executes the program specifies the start point and the end point from the position at which the change in the attribute of the video data was detected, and it is possible to prevent the video data playback apparatus from playing back an unnecessary portion.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

The following explains the digital video recording apparatus of the present invention, with reference to the drawings.

First Embodiment

Figure 1:
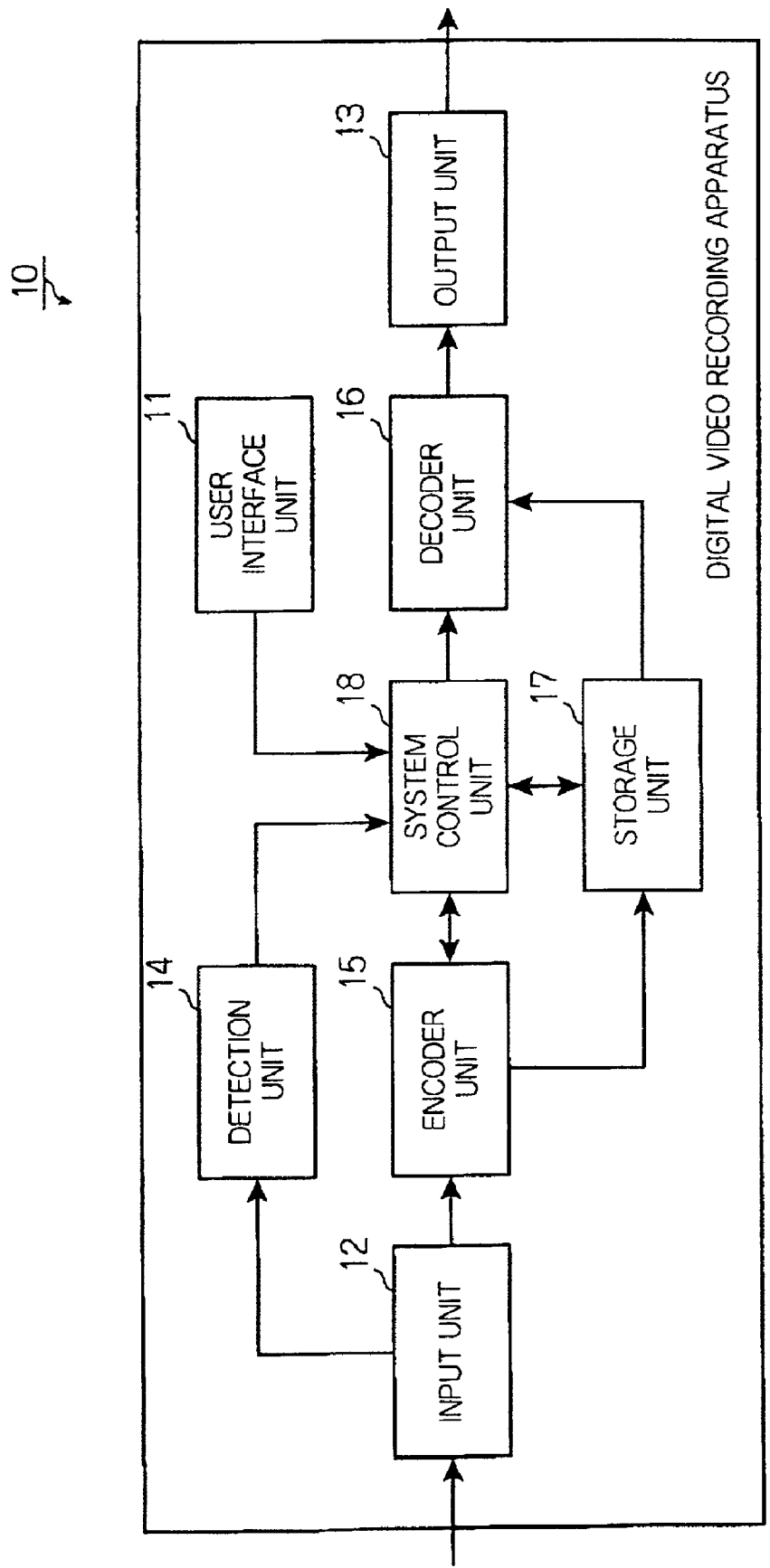
FIG. 1 is a function block drawing of a digital video recording apparatus.
Figure 2:
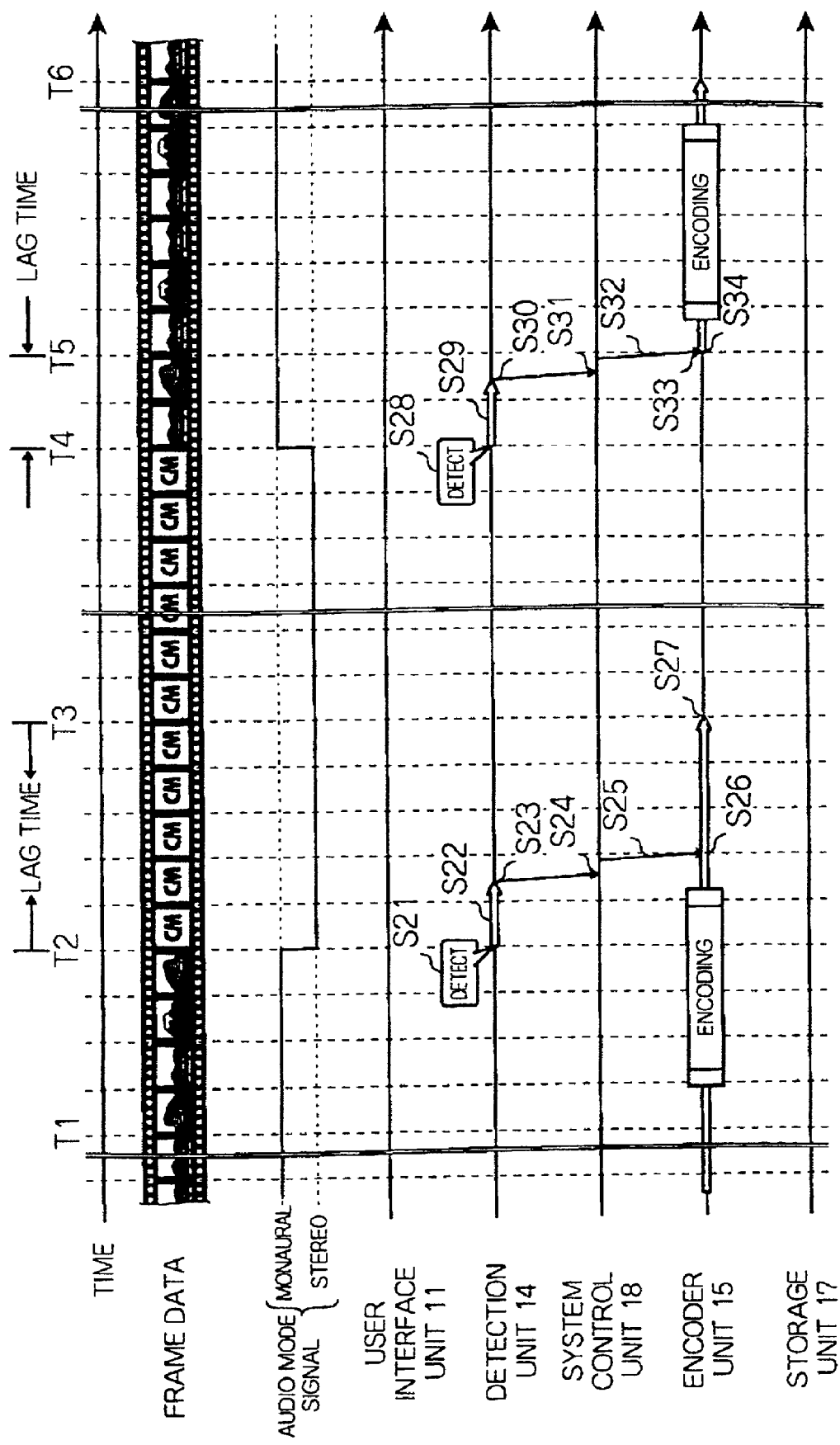
FIG. 2 shows a commercial cut recording sequence.
Figure 3:
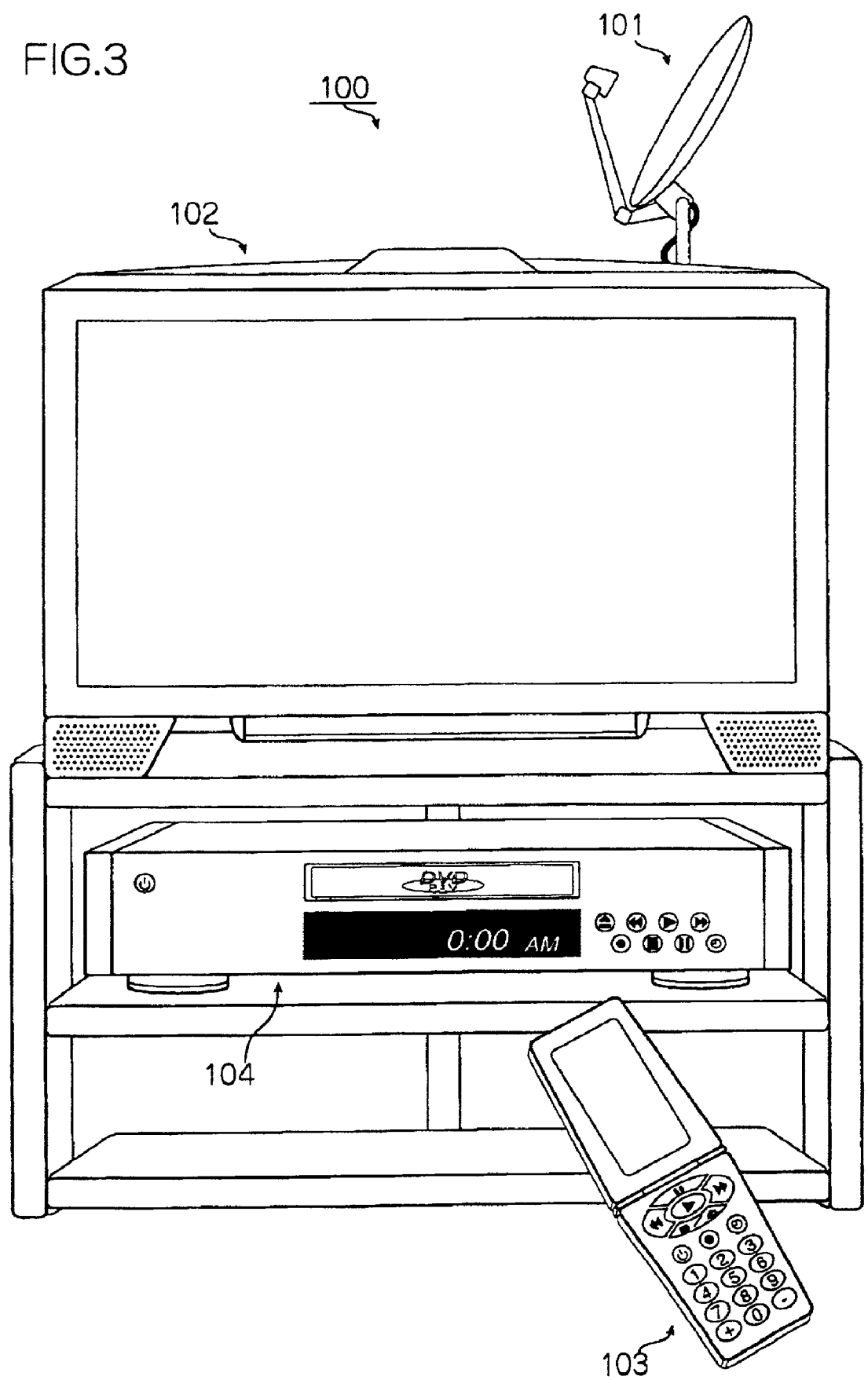
FIG. 3 is an outline of an audio visual system which includes the digital video recording apparatus of the present invention.

FIG. 3 is an outline of an audiovisual system which includes the digital video recording apparatus of the present invention.

In the figure an audiovisual system 100 is composed of an antenna 101, a monitor 102, a remote control 103, and a digital video recording apparatus 104.

The antenna 101 receives a broadcast sent from a broadcast station, and sends the received broadcast to the monitor 102 and the digital video recording apparatus 104. Note that it is supposed that the broadcast is broadcast in analog and includes signals such as an audio signal, a video signal, an audio mode signal, and a copy protect signal.

Here, the audio mode signal shows whether the sound is monaural or stereo. The copy protect signal shows whether the broadcast may be copied or not.

The monitor 102 displays broadcasts received by the antenna 101, and audio/video signals output by the digital video recording apparatus 104.

The remote control 103 is composed of keys and a display panel, and sends requests that it has received through the keys from the user to the monitor 102 and the digital recording apparatus 104. In addition, the remote control 103 notifies the user by way of the display panel of replies from the monitor 102 and the digital recording apparatus 104.

The digital video recording apparatus 104 records a broadcast received by the antenna to a recording medium digitally. In addition, the digital record apparatus 104 outputs the recorded broadcast to the monitor 102 as an audio/video signal. Hereinafter the recording to the recording medium will be referred to as recording, and outputting to the monitor 102 will be referred to as playback.

Here, the recording medium is, for example, a DVD-RAM (Digital Versatile Disk Random Access Memory) or an HD (Hard Disk).

Note that a DVD-RAM uses ZCLV (Zone Constant Linear Velocity) physical format, and a UDF (Universal Disk Format) logical format.

The digital video recording apparatus 104 includes a commercial cut recording function and a copyright protection function.

Here, the commercial cut recording function is a function for recording a broadcast so that the commercials broadcast during the broadcast are not played back.

Here, the copyright protection function is a function for recording a broadcast so that video broadcast during the broadcast that is copyright protected is not played back.

Note that the commercial cut function and the copyright protection function have various recording methods such as cut mode, skip mode (and second skip mode), and separate mode. The method can be selected by the user.

Here, cut mode refers to a method of recording in which recording of a broadcast stops during commercials and copyright protected segments.

Here, skip mode (and second skip mode) refers to a method of continuous recording in which information showing that what is being broadcast is a commercial or a copyright protected segment is stored when the commercial or the copyright protected segment is recorded.

Here, separate mode is a method in which a commercial or a copyright protected segment is recorded separately.

Note that while the lag time which occurs in the copyright protection function is different to that in the commercial cut recording function, other than using the copy protect signal instead of the audio mode signal, the processes of the two function are the same, therefore an explanation of the copyright protect function will be omitted.

<Structure of the Digital Video Recording Apparatus>

Figure 4:
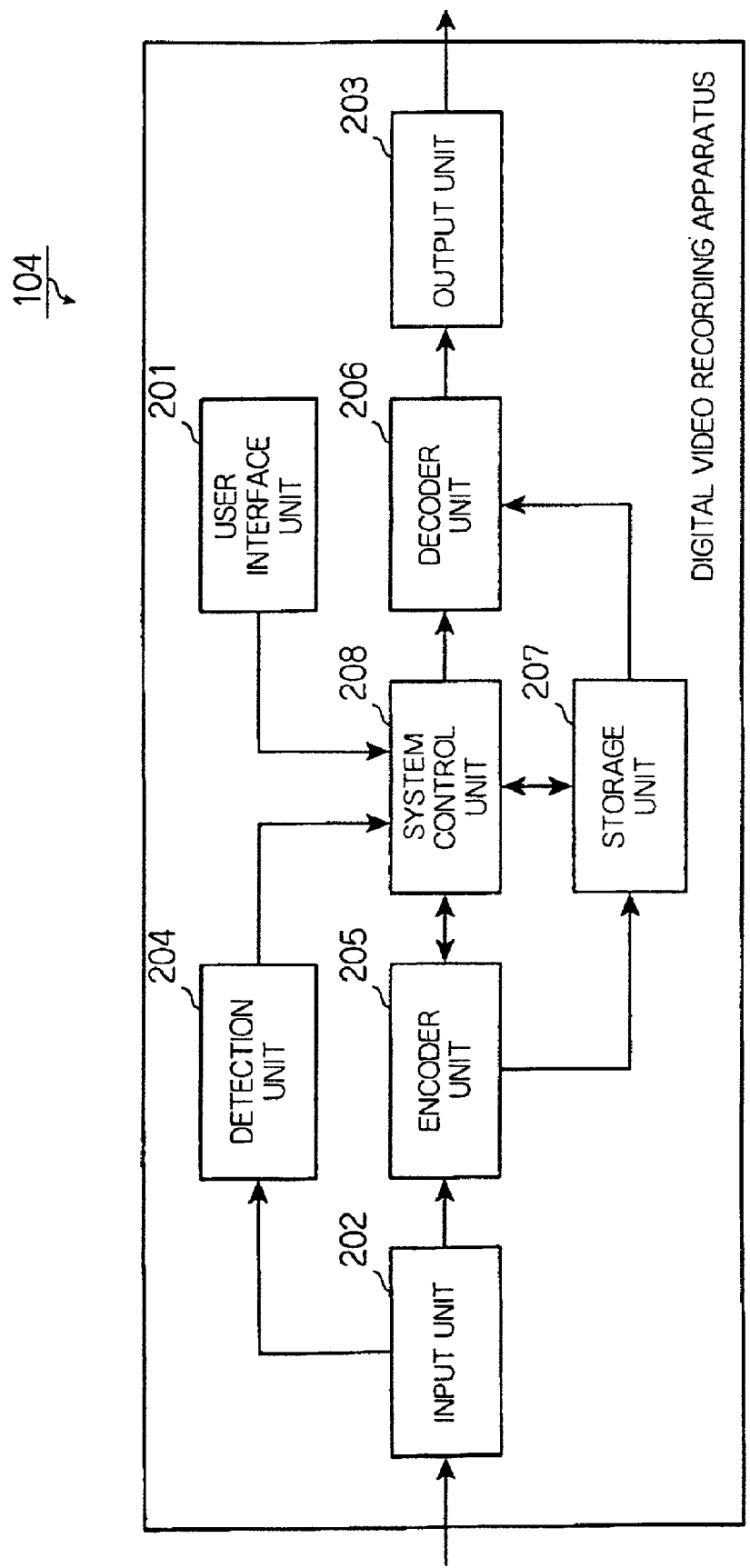
FIG. 4 is a function block drawing of the digital recording apparatus.

FIG. 4 is a function block drawing of the digital video recording apparatus 104.

In the drawing the digital video recording apparatus is composed of a user interface unit 201, an input unit 202, an output unit 203, a detection unit 204, an encoder unit 205, a decoder unit 206, a storage unit 207, and a system control unit 208.

The user interface unit 201 includes an input device such as keys, and an output device such as a display panel. The user interface unit 201 receives requests such as those to start recording or start playback, and sends the requests to the system control unit 208. In addition, the user interface unit 201 also receives requests from the remote control 103, and displays the received requests on the monitor 102.

The input unit 202 converts audio/video signals input through an external input terminal such as an antenna terminal (not illustrated) or a sound video input terminal to frame data, using an A/D converter and then sends the frame data to the encoder unit 205.

The output unit 203 converts the frame data sent from the decoder unit 206 into an audio/video signal, using a D/A converter, and then outputs the audio/video signal to the monitor 102 through an external output terminal such as a audio/video output terminal.

The detection unit 204 monitors the audio mode signal included in the broadcast input into the input unit 202, and notifies the system control unit 208 of the start or end of a commercial when there is a change in the audio mode signal.

Here, a change in the audio mode signal refers to the sound switching from monaural to stereo (start of a commercial), or from stereo to monaural (end of a commercial).

In addition, the detection unit 204 monitors the copy protect signal included in the signal input into the input unit 202, and notifies the system control unit 208 of the start or end of protection when there is a change in the copy protect signal.

Here, a change in the copy protect signal refers to the copying of the broadcast switching from being permitted to being prohibited (start of protection), and prohibited to permitted (end of protection).

The encoder unit 205 starts encoding on receiving an encode start instruction from the system control unit 208, and stops encoding on receiving an encode stop instruction.

Here, encoding refers to a procedure for generating data in a MPEG (Moving Picture Experts Group) program stream format by encoding frame data (field data) sent from the input unit 202. This generated data will be referred to as a "VOB" (Video Object) hereinafter.

In addition, the encoder unit 205 generates VOBUs which make up a VOB, sends VOBU information about these generated VOBUs to the system control unit 208, and sends the VOBUs themselves to the storage unit 207. The encoder unit 205 encodes repeatedly until it receives an encode stop instruction from the system control unit 208.

A VOBU is a unit which forms a VOB. A VOBU includes at least one GOP (Group of Pictures) defined by MPEG video specifications, and is a pack series of a fixed size (2 KB). Note that types of packs include a video pack (hereinafter "V_PCK") which includes video data, and an audio pack (hereinafter "A_PCK") which includes audio data. A_PCKs and V_PCKs are synchronized (interleave) within a 1 second error in the VOBU.

Here, the VOBU information refers to information which includes video frame reproduction start time in the VOBU (VOBU_S_PTM), the size of the first I picture from the head of the VOBU (Reference_Picture_Size), the VOBU size (VOBU_Size), the reproduction time (PB_Time), the aspect ratio, the audio mode, and the audio stream count.

In addition, the encoder unit 205 also performs the function of notifying, when it receives a request to obtain a time code, the time code corresponding to the frame data to be encoded next.

The decoder unit 206 starts decoding on receiving a decode start instruction from the system control unit 208, and stops decoding on receiving a decode stop instruction.

Here, decoding refers to the decoder unit 206 receiving a VOBU sent from the storage unit 207, and reconstructing the VOBU into frame data.

In addition, the decoder unit 206 sends the reconstructed frame data to the output unit 203, and decodes repeatedly until it receives an decode stop instruction from the system control unit 208.

The storage unit 207 is composed of a recording medium, a buffer, and a read/write control program. The storage unit 207 processes management information, and performs reading and writing of VOBUs in response to instructions from the system control unit 208. Specifically, the storage unit 207 performs a VOBU write procedure on receiving a VOBU write instruction, and performs a VOBU read procedure on receiving a VOBU read instruction. Furthermore, the storage unit 207 performs a management information write procedure on receiving a management information write instruction, and performs a management information read procedure on receiving a management information read instruction. These procedures are explained below.

The VOBU write procedure is a procedure in which the storage unit 207 receives a VOBU sent from the encoder unit 205, stores the VOBU in a buffer, writes the VOBU that is stored in the buffer to the recording medium, and clears the buffer.

The VOBU read procedure is a procedure in which the storage unit 207 reads a VOBU written to the recording medium, stores the read VOBU in the buffer, sends the VOBU stored in the buffer to the decoder unit 206, and clears the buffer.

The management information write procedure is a procedure in which the storage unit 207 receives management information from the system control unit 208, and stores the management information in the recording medium as a management information file.

The management information read procedure is a procedure in which the storage unit 207 reads the management information stored in the management information file, and sends the read management information to the system control unit 208. Note that the storage unit 207 notifies the system control unit 208 of an error when there is no management information file stored in the recording medium.

The management information includes playback control information calculated from VOBU information received during recording, and is stored in the recording medium as a management information file when recording ends. The management information is referred to by the system control unit 208 during playback, and controls the playback of a VOBU (or a VOB) stored in the recording medium.

Here, the playback control information is segment information which indicates a playback segment in the VOB when a stored VOB is played back.

The system control unit 208 is composed of hardware such as a microprocessor, a RAM, a ROM, and a timer, and software stored in the ROM such as a system control software. The system control unit 208 receives requests from the user interface unit 201, receives notifications from the detection unit 204, and controls the encoder unit 205, the decoder unit 206, and the storage unit 207. Specifically, the system control unit 208 controls encoding by giving encode start instructions and encode stop instructions to the encoder unit 205, and controls decoding by giving decode start instructions and decode stop instructions to the decoder unit 206. The system control unit 208 controls VOBU read procedures and VOBU write procedures by giving VOBU read instructions and VOBU write instructions to the storage unit 207.

In addition, the system control unit 208 records on receiving a request to start recording from the user interface unit 201, and plays back on receiving a request to start playback from the user interface unit 201.

Recording is a procedure in which the system control unit gives an encode start instruction to the encoder unit 205, has the encoder unit 205 encode, gives a VOBU write instruction to the storage unit 207, and has the storage unit 207 perform the VOBU write procedure.

Playback is a procedure in which the system control unit 208 gives a VOBU read instruction to the storage unit 207, has the storage unit 207 perform a VOBU read procedure, gives a decode start instruction to the decoder unit 206, and has the decoder unit 206 decode.

Furthermore, the system control unit 208 updates the management information each time it receives VOBU information from the encoder unit 205. Specifically, the system control unit 208 gives an encode start instruction to the encoder unit 205, gives a management information read instruction to the storage unit 207, receives the management information from the storage unit 207, stores the received management information in the RAM, and, when VOBU information is sent from the encoder unit 205, updates the management information stored in the RAM based on the sent VOBU information. Then, the system control unit 208 gives an encode stop instruction to the encoder unit 205, receives the last VOBU information sent from the encoder unit 205, updates the management information stored in the RAM based on the received last VOBU information, assimilates the updated management information, and stores the management information in the recording medium as a management information file stored in the RAM.

<Management Information>

The following is an explanation of management information which is referred to and updated by the system control unit 208, when managing a VOBU (or a VOB) generated by the encoder unit 205.

Figure 5:
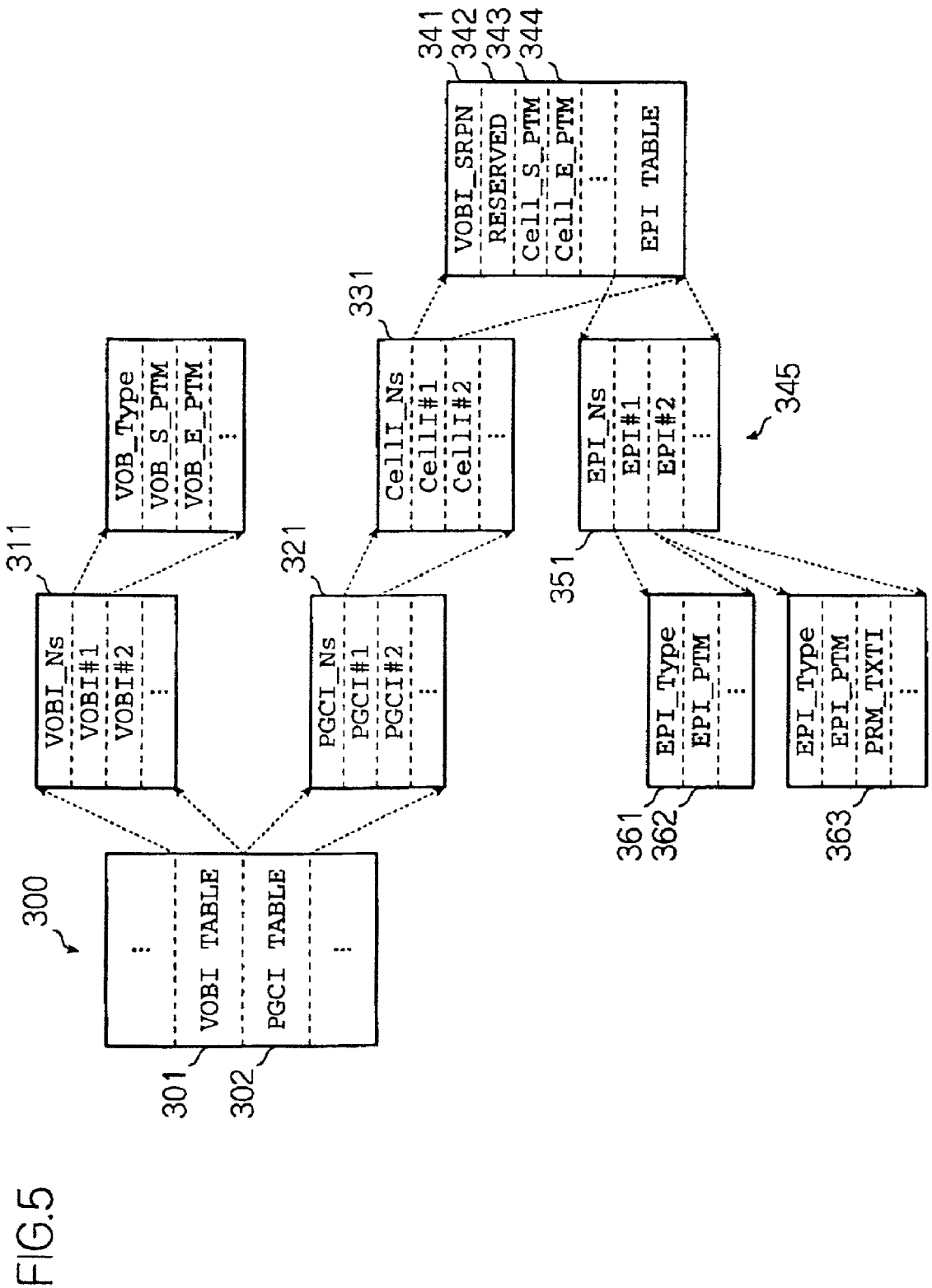
FIG. 5 shows an example of the data structure of management information.

FIG. 5 shows an example of the data structure of management information.

As can be seen from the drawing, management information 300 includes a VOB information table 301 and a broadcast chain information table 302.

<VOB Information Table>

The VOB information table 301 includes a field 311 in which the number of pieces of VOB information (hereinafter "VOBI") (VOBI_Ns) is stored, and a number of VOBIs equal to the number shown in the field 311.

Each VOBI includes the type of VOB (VOB_Type), a playback start time (VOB_S_PTM), and a playback end time (VOB_E_PTM).

<Broadcast Chain Information Table>

The broadcast chain information table 302 includes a field 321 in which the number of pieces of broadcast chain information (hereinafter "PGCI") (PGCI_Ns) is stored, and a number of PGCIs equal to the number shown in the field 321.

Broadcast chain refers to the order in which a plurality of cells showing VOB playback segments (either a whole segment or an arbitrary part of a segment) are played back.

Each PGCI includes a field 331 in which the number of pieces of cell information (hereinafter "CellI") is stored, and a number of CellIs equal to the number shown in the field 331.

Each CellI includes a field 341, a field 342, a field 343, a field 344, and an entry point information table 345. An entry point is information showing a position (for example a frame or a time) specified by the user or the system control unit, in the playback segment shown by the cell information.

A pointer to the VOB information corresponding to the cell (VOBI_SRPN) is stored in the field 341.

A non-playback segment flag (RESERVED) which has a value of either "TRUE" or "FALSE", and is used in separate mode is stored in the field 432.

Here, a non-playback segment flag has a value showing whether a segment is not played back. "FALSE" shows that a segment is played back, and "TRUE" shows that a segment is not played back.

A playback start time of a cell (Cell_S_PTM) is stored in the field 343.

A playback end time of a cell (Cell_E_PTM) is stored in the field 344.

The entry point information table 345 includes a field in which the number of pieces of entry point information (hereinafter "EPI") (EPI_Ns) is stored, and a number of EPIs equal to that shown in the field 351.

Each EPI includes a field 361 and a field 362.

A type of entry point (EPI_Type) is stored in the field 361.

A time specified by the user or the system control unit 208 (EPI_PTM) is stored in the field 362.

In addition, each EPI includes a field 363 in which text data (PRM_TXT), according to the type stored in the field 361 is stored.

The control playback information is included in the CellI.

<Operations of the Digital Video Recording Apparatus>

The following explains the operations of the digital video recording apparatus 104 having the above-described structure.

As an example, the following explanation will be about the commercial cut recording function when a broadcast is recorded with the following pattern: first recording starts, then a commercial starts, the commercial ends, and finally the recording ends.

In the following the start of recording to the start of the commercial will be the "first recording segment", the end of the commercial to the end of recording will be the "second recording segment", and the start of the commercial to the end of the commercial will be the "commercial segment". Furthermore, it will be assumed that when the detection unit 204 uses a switch in the audio mode signal from monaural to stereo to judge that the start of the commercial, when the broadcast proceeds from the first recording segment to the commercial segment. In the same way, it will be assumed that the detection unit 204 uses a switch in the audio mode signal from stereo to monaural to judge that end of the commercial, when the broadcast proceeds from the commercial segment to the second recording segment.

Note that in order to keep the explanation concise it will be assumed that no other broadcasts are stored on the recording medium.

<Commercial Cut Recording Function in the Cut Mode>

The following explains the commercial cut mode of the of the digital video recording apparatus 104 in the first embodiment, assuming that the user has selected cut mode in advance.

<System Control Unit 208 Processing When a Commercial Starts>

Figure 6:
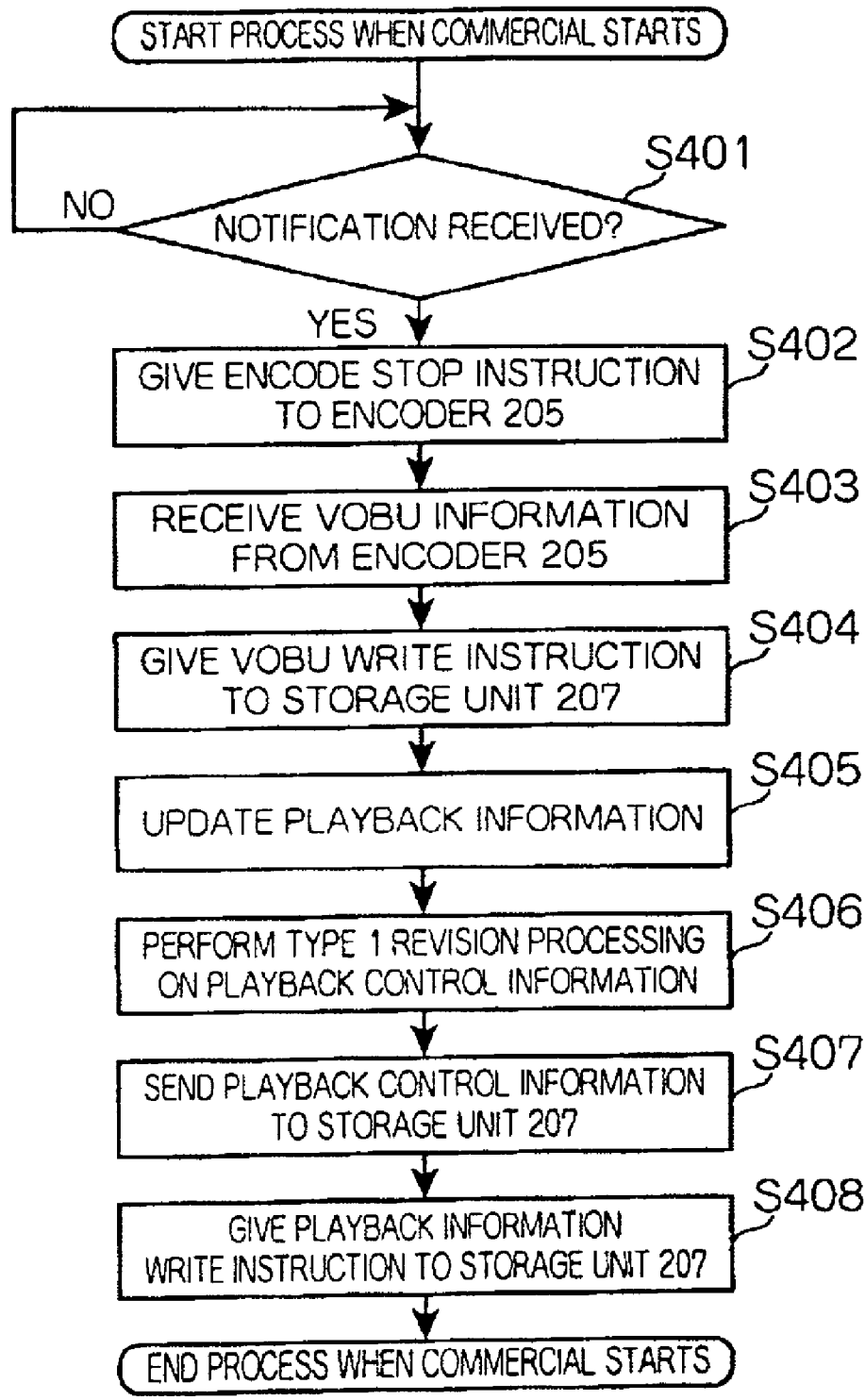
FIG. 6 is a flowchart of the processing of the system control unit when a commercial starts in the first embodiment.

FIG. 6 is a flowchart showing the processing of the system control unit 208 when a commercial starts in the first embodiment.

As shown in the flowchart, the system control unit 208 receives notification from the detection unit 204 that a commercial has started (step S401), and gives an encode stop instruction to the encoder unit 205 (step S402). Next, the system control unit 208 receives VOBU information sent from the encoder unit 205 (step S403), and gives a VOBU write instruction to the storage unit (step S403). Then the system control unit 208 updates the management information, based on the received VOBU information (step S405), performs a type 1 revision process on the updated management information (step S406), sends the revised management information to the storage unit 207 (step S407), and then gives a management information write instruction to the storage unit 207 (step S408).

Here, the type 1 revision process is a process of subtracting the time lag (Time_Lag) from the cell playback end time (Cell_E_PTM) included in the cell information, as shown in Epression 1 below, and re-updating the cell playback end time (Cell_E_PTM).

<Expression 1> Cell_E_PTM=Cell_E_PTM−Time_Lag

Here, time lag (Time_Lag) is the time required from when the detection unit 204 monitors the audio mode signal and detects the start of a commercial (or the end of a commercial) until it receives an encode instruction from the system control unit 208 and stops the encoding process.

<Operation Example of the Commercial Cut Recording Function in Cut Mode>

Figure 7:
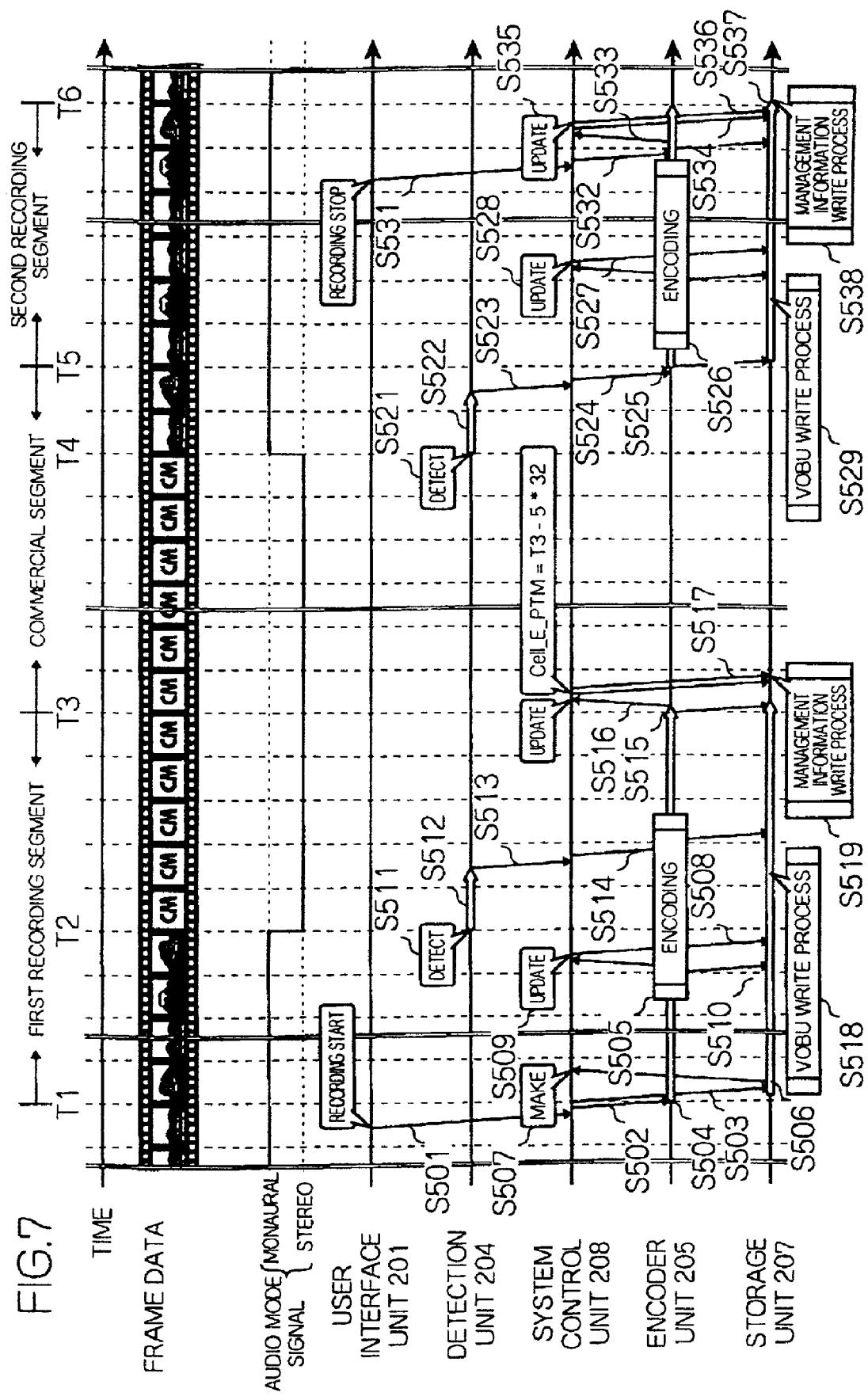
FIG. 7 shows an example of a commercial cut recording sequence in cut mode.

FIG. 7 shows an example of a commercial cut recording sequence in cut mode.

The figure shows, starting from the top, an audio/video signal and an audio mode signal received through an antenna, and the constituent features of the digital video recording apparatus 104. Note that the audio/video signal is displayed as frame data.

In the following a VOB generated in the first recording segment is called VOB#1 and a VOB generated in the second recording segment is called VOB#2.

<Start of Recording>

The user interface unit 201 receives a request to start recording from the user and sends the received request to the system control unit 208 (step S501).

The system control unit 208 receives the request from the user interface unit 201 to start recording, gives an encode start instruction to the encoder unit 205 (step S502), and gives a management information read instruction to the storage unit 207 (step S503).

The encoder unit 205 receives the encode start instruction from the system control unit 208, begins encoding, and generates a new VOB (step S504). Next, the encoder unit 205 generates VOBUs which form the VOB, until receiving an encode stop instruction from the system control unit 208, sends the generated VOBUs to the storage unit 207, and sends VOBU information about the generated VOBUs to the system control unit 208 (step S505).

The storage unit 207 receives the management information read instruction from the system control unit 208, executes a management information read procedure, and notifies the system control unit 208 of a read error (step S506).

The system control unit 208 receives the read error from the storage unit 207, makes new management information, and stores the management information in the RAM (step S507). Next, the system control unit 208 gives a VOBU write instructions to the storage unit 207 each time it receives VOBU information sent form the encoder unit 205 (step S508). Furthermore, the system control unit 208 updates the management information based on the received VOBU information (step S509).

The storage unit 207 executes the VOBU write procedure each time it receives VOBU write instructions from the system control unit 208, and stores the VOBU sent from the encoder unit 205 in the recording medium (step S510).

<Start of a Commercial>

The detection unit 204 monitors the audio mode signal, and after detecting the start of a commercial (step S511), monitors the audio mode signal for a further 1 frame (32 msec) (step S512), and notifies the system control unit 208, when it has determined that stereo sound continues, that a commercial has started (step S513).

The system control unit 208 receives the notification from the detection unit 204 that the commercial has started, and gives an encode stop order to the encoder unit 205 encoding (step S514).

The encoder unit 205 receives the encode stop instruction from the system control unit 208 and stops encoding. Then, the encoder unit 205 sends the generated VOBUs to the storage unit 207, and sends VOBU information about the generated VOBUs to the system control unit 208 (step S515).

The system control unit 208 receives the VOBU information sent from the encoder unit 205, gives a VOBU write instruction to the storage unit 207 (step S516), and then the system control unit 208 updates the management information based on the received VOBU information. Next, the system control unit 208 performs type 1 revision processing on the updated management information, sends the revised management information to the storage unit 207, and gives a management information write instruction to the storage unit 207 (step S517).

The storage unit 207 receives a VOBU write instruction from the system control unit 208, and executes a VOBU write procedure, and stores the VOBU sent from the encoder unit 205 in the recording medium (step S518). In addition, the storage unit 207 receives management information sent from the system control unit 208, further receives a management information write instruction, executes a management information write procedure, and stores the received management information in the management information file (step S519).

In this way, VOB#1 is formed from VOBUs generated in the first recording segment.

<End of the Commercial>

The detection unit 204 monitors the audio mode signal, detects that the commercial has ended (step S521) and further monitors the audio mode signal for one frame (32 msec) after detecting the end of the commercial (step S522), and after confirming that monaural sound continues, notifies the system control unit 208 that the commercial has ended (step S523).

The system control unit 208 receives notification from the detection unit 204 that the commercial has ended, and gives an encode start instruction to the encoder unit 205 (step S524).

The encoder unit 205 receives the encode start instruction from the system control unit 208, starts encoding, and generates a new VOB (step S525). The encoder unit 205 generates VOBUs which form the new VOB until it receives an encode stop instruction from the system control unit 208, then sends the generated VOBUs to the storage unit 207, and sends VOBU information about the generated VOBUs to the system control unit 208 (step S526).

The system control unit 208 sends a VOBU write instruction to the storage unit 207 each time it receives VOBU information from the encoder unit 205 (step S527). In addition, the system control unit 208 updates the management information based on the received VOBU information (step S528).

The storage unit 207 executes a VOBU write procedure and records the VOBU units in the recording medium each time it receives a VOSU write instruction from the system control unit 208 (step S529).

<End of Recording>

The user interface unit 201 receives a request from the user to stop recording, and sends the received request to the system control unit 208 (step S531)

The system control unit 208 receives the request to stop recording sent from the user interface unit 201, and gives an encode stop instruction to the encoder unit 205 (step S532).

The encoder unit 205 receives the encode stop instruction from the system control unit 208, and stops encoding. Then the encoder unit 205 sends generated VOBUs to the storage unit 207, and sends VOBU information about the generated VOBUs to the system control unit 208 (step S533).

The system control unit 208 receives the VOBU information sent from the encoder unit 205, and gives a VOBU write instruction to the storage unit (step S534). In addition, the system control unit 208 updates the management information based on the received VOBU information (step S535). Then, the system control unit 208 sends the updated management information to the storage unit 207, and gives a management information write instruction to the storage unit 207 (step S536).

The storage unit 207 receives the VOBU write instruction from the system control unit 208, executes a VOBU write procedure, and stores the sent VOBUs in the recording medium (step S537). In addition, the storage unit 207 receives the management information sent from the system control unit 208, receives the management information write instruction, performs the management information write procedure, and stores the received management information as a management information file in the recording medium (step S538).

In this way, a VOB#2 is formed by VOBUs generated in the second recording segments.

<Specific Example of Management Information>

Figure 8:
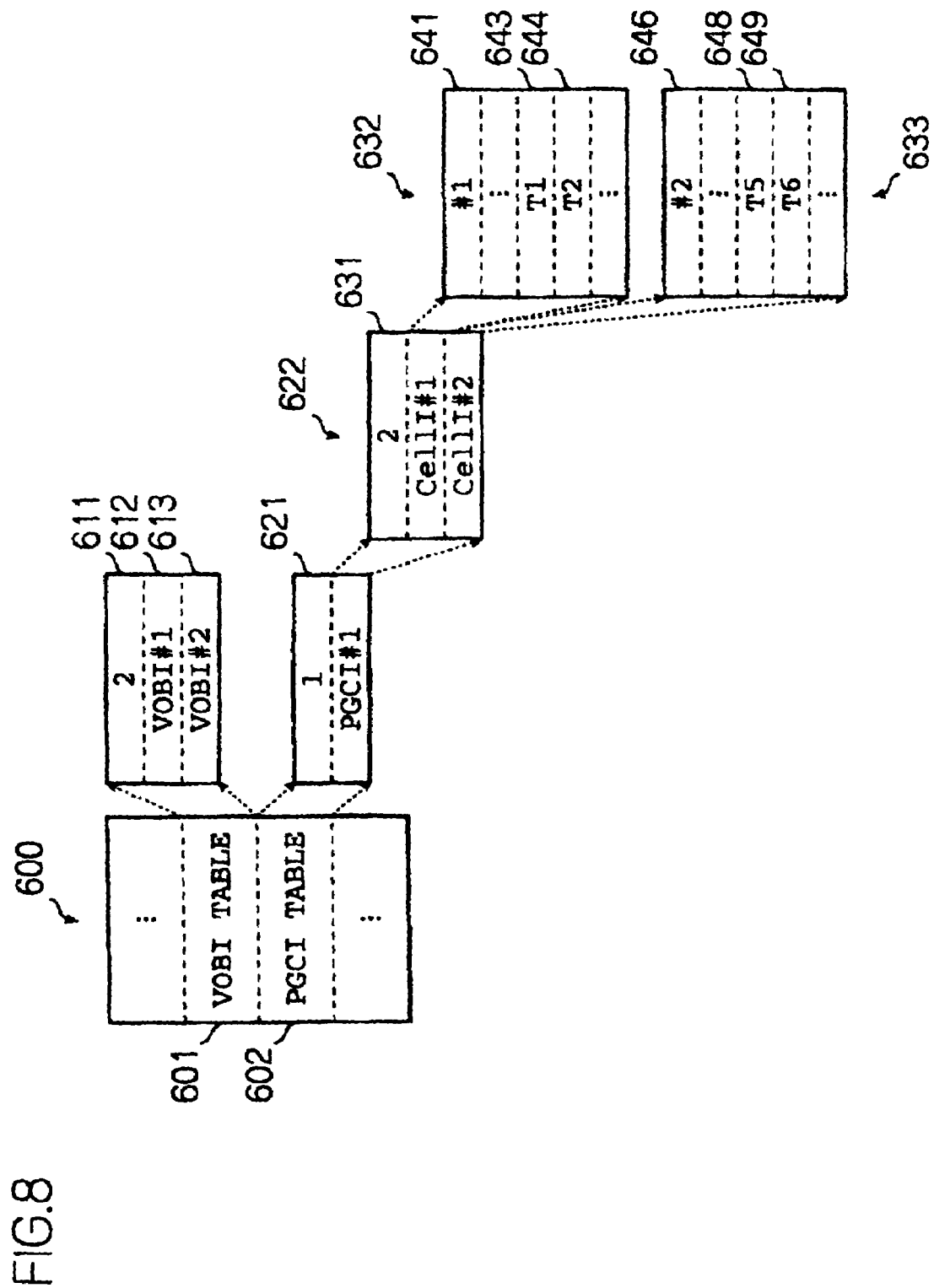
FIG. 8 shows an example of management information data made by the system control unit in a commercial cut recording sequence in cut mode.

FIG. 8 shows an example of management information data generated by the system control unit 208 in the commercial cut recording sequence in cut mode.

As shown in the figure, management information 600 includes a VOBI table 601 and a PGCI table 602.

The VOBI table 601 is composed of a field 611, a table 612, and a table 613.

A number "2" that is the number of VOBIs stored in the VOBI table 601 is stored in the field 611.

VOBI "VOBI#1" about the VOB#1 is stored in the table 612.

VOBI "VOBI#2" about the VOB#2 is stored in the table 613.

The PGCI table 602 is composed of a field 621 and a table 622.

A number "1" that is the number of PGCIs stored in the PGCI table 602 is stored in the field 621.

A PGCI "PGCI#1" generated in one recording operation is stored in the table 622.

The table 622 is further composed of field 631, a table 632, and a table 633.

A number "2" that is the numbers of CellIs stored in the table 622 is stored in the field 631.

CellI "CellI#1" which corresponds to the VOB#1 is stored in the table 632.

CellI "CellI#2" which corresponds to the VOB#2 is stored in the table 633.

The table 632 also includes a field 641, a field 643, and a field 644.

A search pointer (reference number) "#1" for the VOBI#1 is stored in the field 641.

A cell playback start time "T1" is stored in the field 643.
A cell playback end time "T2" is stored in the field 644.
The table 633 includes a field 646, a field 648, and a field 649.

A search pointer (reference number) "#2" for VOBI#2 is stored in the field 642.

A cell playback start time "T5" is stored in the field 648.
A cell playback end time "T6" is stored in the field 649.
The playback control information included in the management information is the information stored in the field 644.

<Playback Procedure>

Next, playback of a broadcast recorded according to commercial cut recording (cut mode) will be explained.

Figure 9:
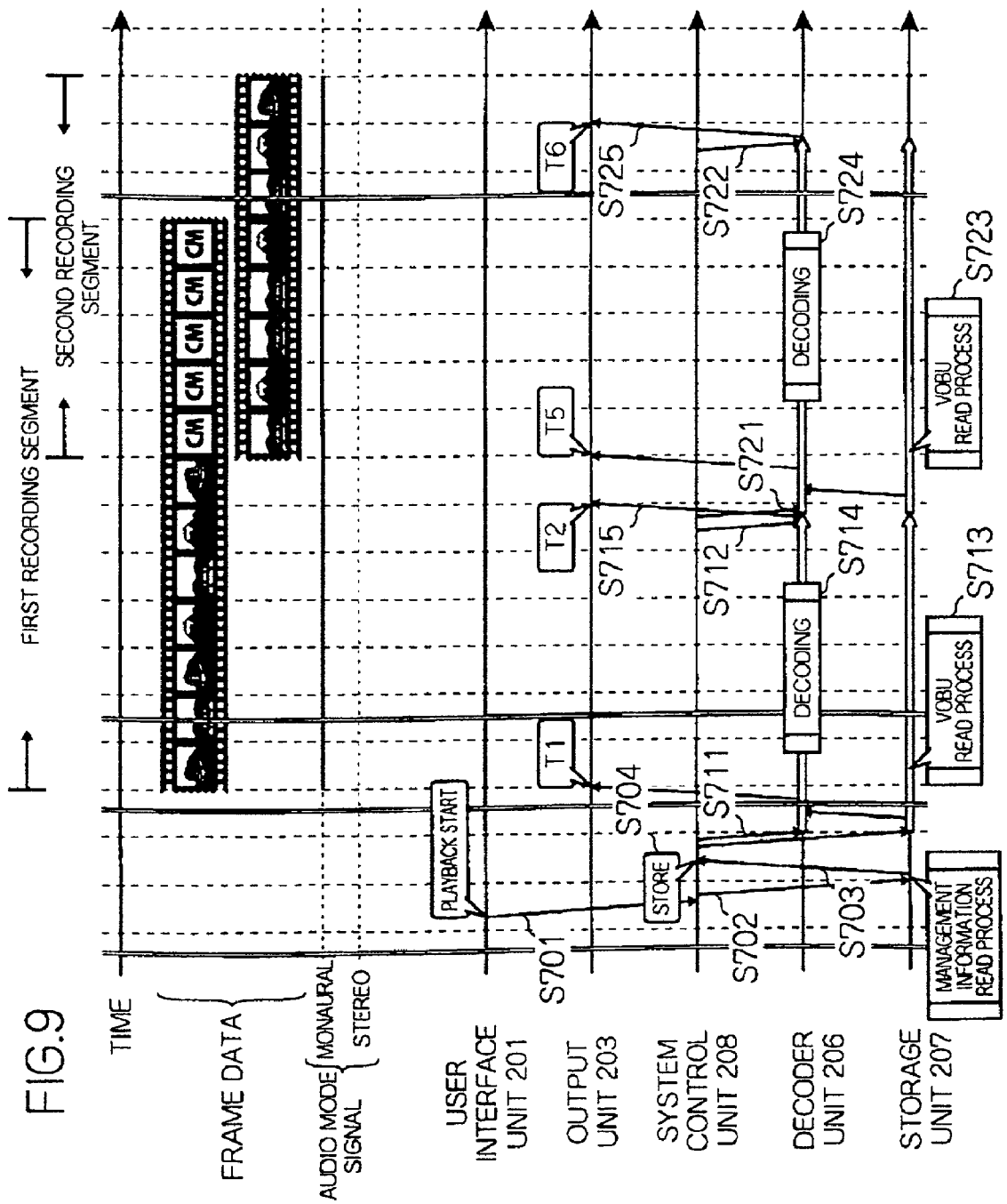
FIG. 9 shows an example of playback sequence in cut mode.

FIG. 9 shows an example of a playback processing sequence in cut mode.

The diagram shows played back frame data, and an audio mode signal, and also each component of the digital video recording apparatus 104.

<Start of Playback>

The user interface unit 201 receives a request from the user to play back, and sends the received request to the system control unit 208 (step S701).

The system control unit 208 receives the request sent from the user interface unit 201 to play back, and gives a management information read instruction to the storage unit 207 (step S702).

The storage unit 207 receives the management information read instruction from the system control unit 208, executes a management information read procedure, and sends the management information stored in the recording medium as a management information file to the system control unit 208 (step S703).

The system control unit 208 receives the management information sent from the storage unit 207, and stores the management information in the RAM (step S704).

<First Recording Sector>

Next, the system control unit 208 extracts the cell playback start time ("T1") and the cell playback end time ("T2") in the CellI#1 in the PGCI#1, from the management information stored in the RAM, and sends a VOBU read instruction to the storage unit 207 and a decode start instruction to the decoder unit 206, based of the extracted cell playback start time ("T1") and the cell playback end time ("T2") (step S711).

Then, the system control unit 208 gives VOBU read instructions to the storage unit 207 for the VOBUs from the cell start time ("T1") to the cell end time ("T2") in the order that the VOBUs were recorded, has the storage unit 207 read the VOBUs which make up the VOB#1 stored in the recording medium, gives the decoder unit 206 a decode start instruction, and has the decoder unit 206 decode the VOBUs. Then, the system control unit 208 measures the time that the decoder unit 206 will decode the VOBU corresponding to the cell playback end time ("T2"), and gives the decoder a decode stop instruction (step S712).

The storage unit 207 receives the VOBU read instruction from the system control unit 208, performs a VOBU read procedure, reads the VOBUs that make up the VOB#1 from the cell playback start time ("T1") to the cell playback end time ("T2") in the order in which the VOBUs were recorded, and sends the read VOBUs to the decoder unit 206 (step S713).

The decoder unit 206 receives the decode start instruction from the system control unit 208, starts decoding, and decodes the VOBUs sent from the storage unit 207 into frame data(step S714). The decoder unit 206 continues to decode the VOBUs sent from the storage unit 207 and sends the decoded frame data to the output unit 203, until receiving the decode stop instruction from the system control unit 208 (step S715).

Note that from amongst the decoded frame data, the decoder unit 206 sends frame data up to and including the frame data which corresponds to the cell playback end time ("T2").

<Second Recording Segment>

Next, the system control unit 208 extracts the cell playback start time ("T5") and the cell playback end time ("T6") in the CellI#2 in the PGCI#2, from the management information stored in the RAM, and sends a VOBU read instruction to the storage unit 207 and a decode start instruction to the decoder unit 206, based on the extracted cell playback start time ("T5") and the cell playback end time ("T6") (step S721).

Then, the system control unit 208 gives VOBU read instructions to the storage unit 207 for the VOBUs from the cell start time ("T5") to the cell end time ("T6") in the order that the VOBUs were recorded, has the storage unit 207 read the VOBUs which make up the VOB#2 stored in the recording medium, gives the decoder unit 206 a decode start instruction, and has the decoder unit 206 decode the read VOBUs. Then, the system control unit 208 measures the time that the decoder unit 206 will decode the VOBU corresponding to the cell playback end time ("T6"), and gives the decoder a decode stop instruction (step S722)

The storage unit 207 receives the VOBU read instruction from the system control unit 208, performs a VOBU read procedure, reads the VOBUs that make up the VOB#2 from the cell playback start time ("T5") to the cell playback end time ("T6") in the order in which the VOBUs were recorded, and sends the read VOBUs to the decoder unit 206 (step S723).

The decoder unit 206 receives the decode start instruction from the system control unit 208, starts decoding, and decodes the VOBUs sent from the storage unit 207 into frame data. The decoder unit 206 continues to decode the VOBUs sent from the storage unit 207 and sends the decoded frame data to the output unit 203, until receiving the decode stop instruction from the system control unit 208 (step S725).

Note that from amongst the decoded frame data, the decoder unit 206 sends frame data up to and including the frame data which corresponds to the cell playback end time ("T6").

In this way, in playback in cut mode, the segment from the cell playback start time to the cell playback end time is the object of playback, meaning that the first recording segment is played back up to the cell playback end time ("T2") because of type 1 revision. As a result, playback of the commercial is entirely prevented.

Second Embodiment

<Commercial Cut Recording Function in Skip Mode>

The following explains the commercial cut recording function (skip mode) of the digital video recording apparatus 104 in the second embodiment, assuming the user has selected skip mode in advance.

Note that procedures that are the same as the commercial cut recording (cut mode) of the first embodiment have the same reference numbers. The following concentrates on the procedures that differ to the first embodiment.

<Processing of the System Control Unit 208 When a Commercial Starts>

Figure 10:
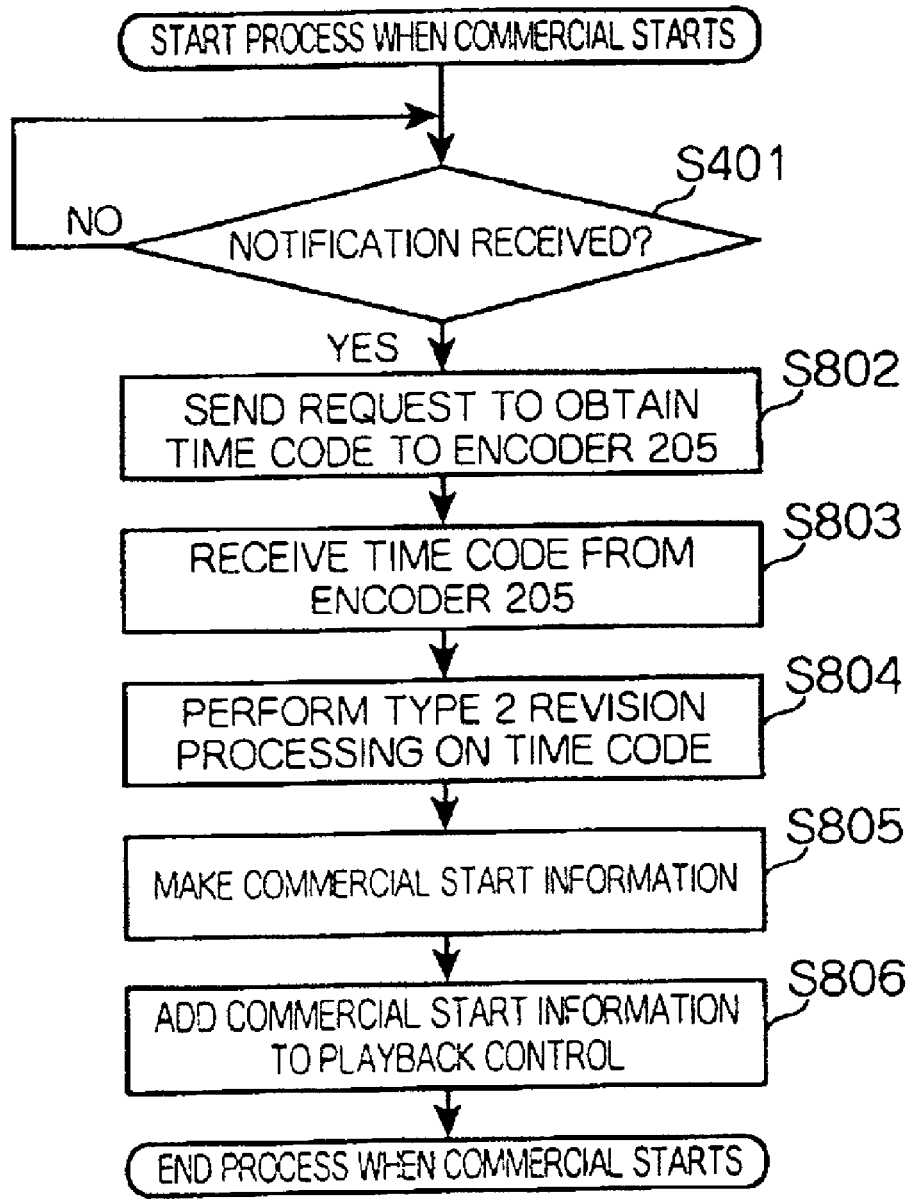
FIG. 10 is a flowchart of the processing of the system control unit when a commercial starts in the second embodiment.

FIG. 10 is a flowchart showing the processing of the system control unit 208 when a commercial starts in the second embodiment.

As shown in the flowchart, the system control unit 208 receives notification from the detection unit 204 that a commercial has started (step S401), and sends a request to the encoder unit 205 to obtain a time code (step S802) Next, the system control unit 208 receives the time code from the encoder unit 205 (step S803), and performs a second type revision process on the received time code (step S804). Then, the system control unit 208 makes commercial start information which consists of the time code and text information showing the start of the commercial (step S805), and adds the commercial start information to the management information as EPI (step S806).

Here, the second type revision process is a process for re-updating the received time code (Time_Code) according to the time lag (Time_Lag) and the encoding process time (Encode_Time), based on Expression 2.

Expression 2: Time_Code=Time_Code+Encode_Time−Time_Lag

Here, time lag is the time needed from when the detection unit 204 detects that a commercial has started (or ended) until the encoder unit 205 receives notification of that the commercial has started (or ended).

Here, encoding time is the time needed for the pictures for the pictures that make up a VOBU to be generated by encoding frame data input in the encoder unit 205.

Note that the system control unit 208 makes commercial end information when a commercial ends, in the same way as when a commercial starts. The commercial end information is made up of a time code which has been subjected to second type revision process, and text information showing the end of the commercial, and is added to the management information (EPI).

<Operation Example of Commercial Cut Recording Function in Skip Mode>

Figure 11:
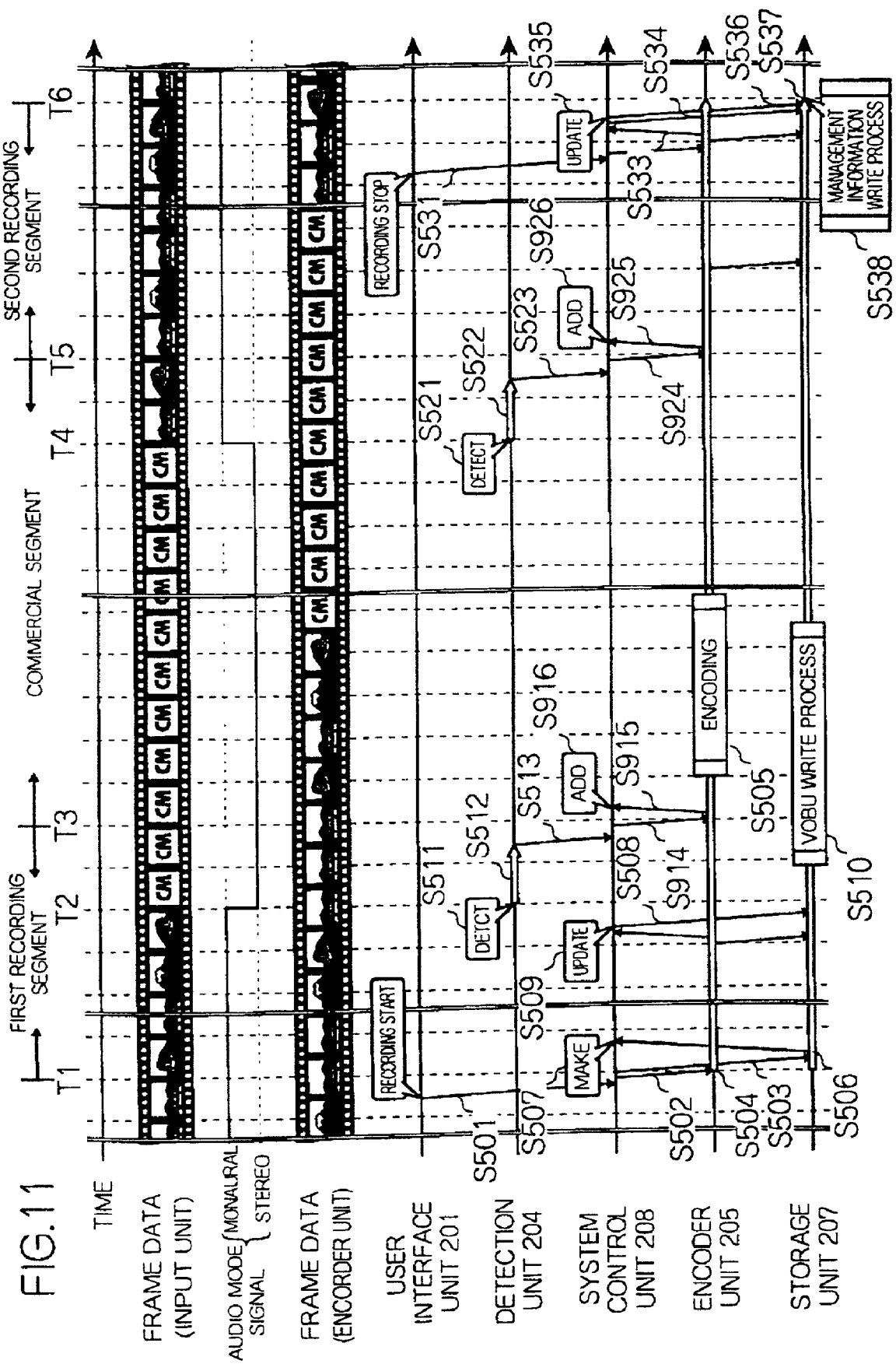
FIG. 11 shows an example of a commercial cut recording sequence in skip mode.

FIG. 11 shows an example of a commercial cut recording sequence in skip mode.

The figure shows, starting from the top, an audio/video signal and an audio mode signal received through an antenna, frame data which is to be encoded by the encoder unit 205, and the constituent features of the digital video recording apparatus 104. Note that the audio/video signal is displayed as frame data.

In the following a VOB generated over the first recording sector, the commercial sector, and the second recording sector will be called VOB#1.

<Start of Recording>

The sequence when recording starts is the same as that in the first embodiment from steps S501 to S510, so an explanation of these steps will be omitted.

<Start of Commercial>

The sequence when a commercial starts is the same as that in the first embodiment from steps S511 to S513, but differs in that it has steps S914 to S916 instead of steps S514 to S519. Note that an explanation of steps S511 to S513 shown in the first embodiment is omitted.

The system control unit 208 receives notification from the detection unit 204 that a commercial has started, and sends a request to the encoder unit 205 to obtain a time code (step S914).

The encoder unit 205 receives the request from the system control unit 208 to obtain the time code, and sends the time code corresponding to the next encoded frame data to the system control unit 208 (step S915).

The system control unit 208 receives the time code sent from the encoder unit 205, performs second type revision processing on the received time code, makes commercial start information consisting of the processed time code and text information showing the start of the commercial, and then adds the commercial start information to the management information (EPI) (step S916).

<End of the Commercial>

The sequence when the commercial ends differs from the first embodiment in that after steps S521 to S523, it has steps S924 to S926 instead of steps S524 to S529. Note that an explanation of steps S521 to S523 shown in the first embodiment will be omitted.

The system control unit 208 receives notification from the detection unit that the commercial has ended, and sends a request to obtain the time code to the encoder unit 205 (step S924).

The encoder unit 205 receives the request sent from the system control unit 208 to obtain the time code, and sends the time code corresponding to the next frame data that is encoded to the system control unit 208 (step S925).

The system control unit 208 receives the time code sent from the encoder unit 205, performs second type revision processing on the received time code, makes commercial end information consisting of the processed time code and text information showing the end of the commercial, and adds the commercial end information to the management information (EPI) (step S926).

<End of Recording>

In the second embodiment the sequence when recording ends is the same as that from steps S531 to S538 shown in the first embodiment, so an explanation will be omitted.

<Specific Example of Management Information>

Figure 12:
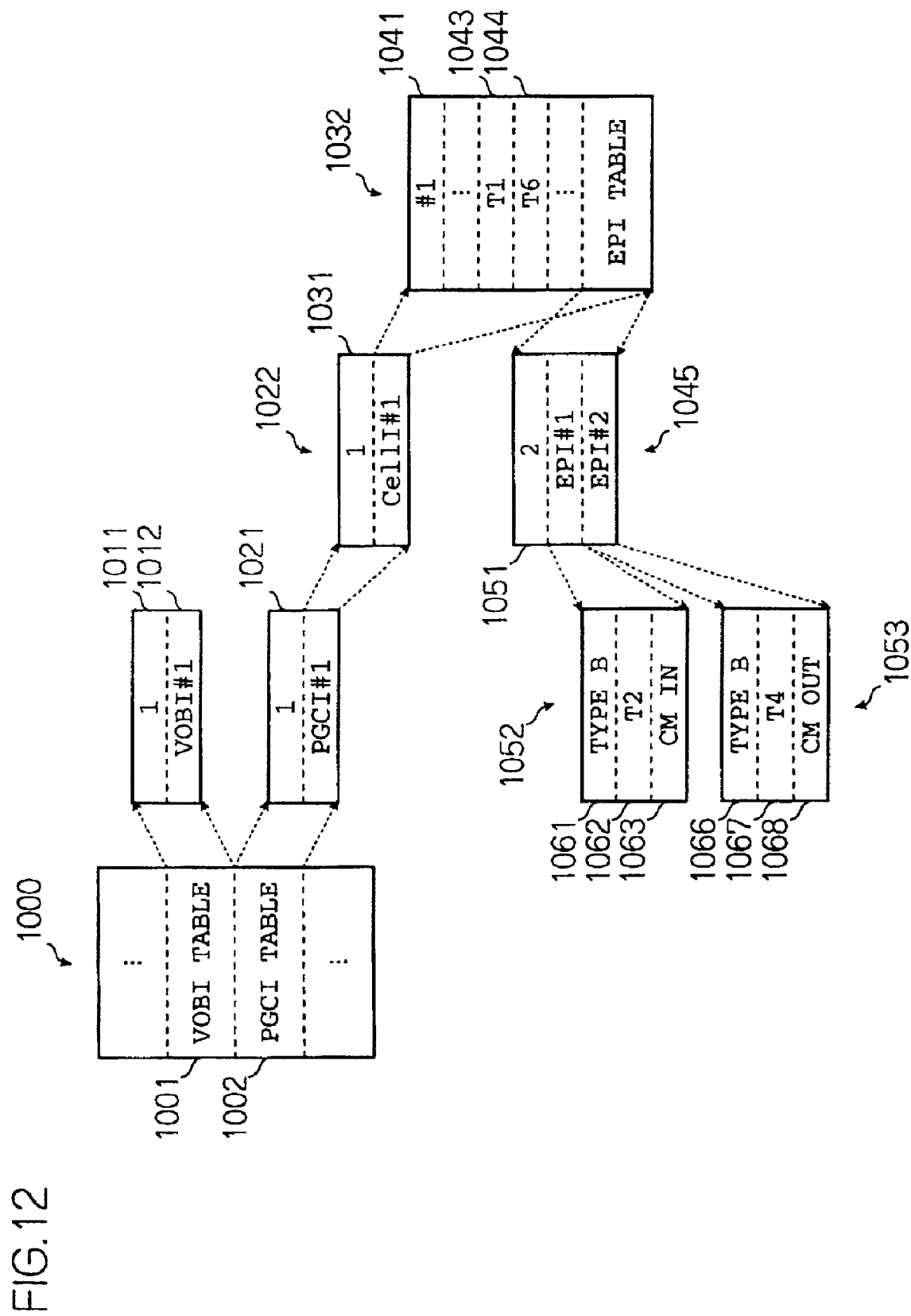
FIG. 12 shows an example of management information data made by the system control unit in a commercial cut recording sequence in skip mode.

FIG. 12 shows an example of management information data generated in the system control unit 208, in the commercial cut recording sequence in skip mode.

As shown in the figure, management information 1000 includes a VOBI table 1001 and a PGCI table 1002.

The VOBI table 1001 is composed of a field 1011 and a field 1012.

A number "1" which is the number of VOBIs stored in the VOBI table 1001 is stored in the field 1011.

VOBI "VOBI#1" about the VOB#1 is stored in the table 1012.

The PGCI table 1002 is composed of a field 1021 and a table 1022.

A number "1" which is the number of PGCI stored in the PGCI table 1002 is stored in the field 1021.

PGCI "PGCI#1" generated in one recording operation is stored in the table 1022.

The table 1022 is also composed of a field 1031 and a table 1032.

A number "1" which is the number of CellIs stored in the table 1022 is stored in the field 1031.

CellI "CellI#1" corresponding to the VOB#1 is stored in the table 1032.

The table 1032 also includes a field 1041, a field 1043, a field 1044, and a table 1045.

A search pointer (reference number) "#1" for the VOBI#1 is stored in the field 1041.

A cell start time "T1" is stored in the field 1043.

A cell end time "T6" is stored in the field 1044.

An EPI table is stored in the table 1045.

The EPI table 1045 is composed of a field 1051, a record 1052, and a record 1053.

A number "2" which is the number of EPIs stored in the EPI table 1045 is stored in the field 1051.

EPI "EPI#1" in which the commercial start information is stored is stored in the record 1052.

EPI "EPI#2" in which the commercial end information is stored is stored in the record 1053.

The record 1052 is also composed of a field 1061, a field 1062, and a field 1063.

The type "TYPE B" of the EPI is stored in the field 1061.

The commercial start time "T2" is stored in the field 1062.

Text information "CM IN" which shows the start of the commercial is stored in the field 1063.

The record 1053 is also composed of a field 1066, a field 1067, and a field 1068.

The type "TYPE B" of the EPI is stored in the field 1066.

The commercial end time "T4" is stored in the field 1067.

Text information "CM OUT" which shows the end of the commercial is stored in the end of the field 1068.

The playback control information included in the management information 1000 is the information stored in the records 1052 and 1053.

<Playback Procedure>

Next, playback of a broadcast recorded by a commercial cut recording (skip mode) will be explained.

Figure 13:
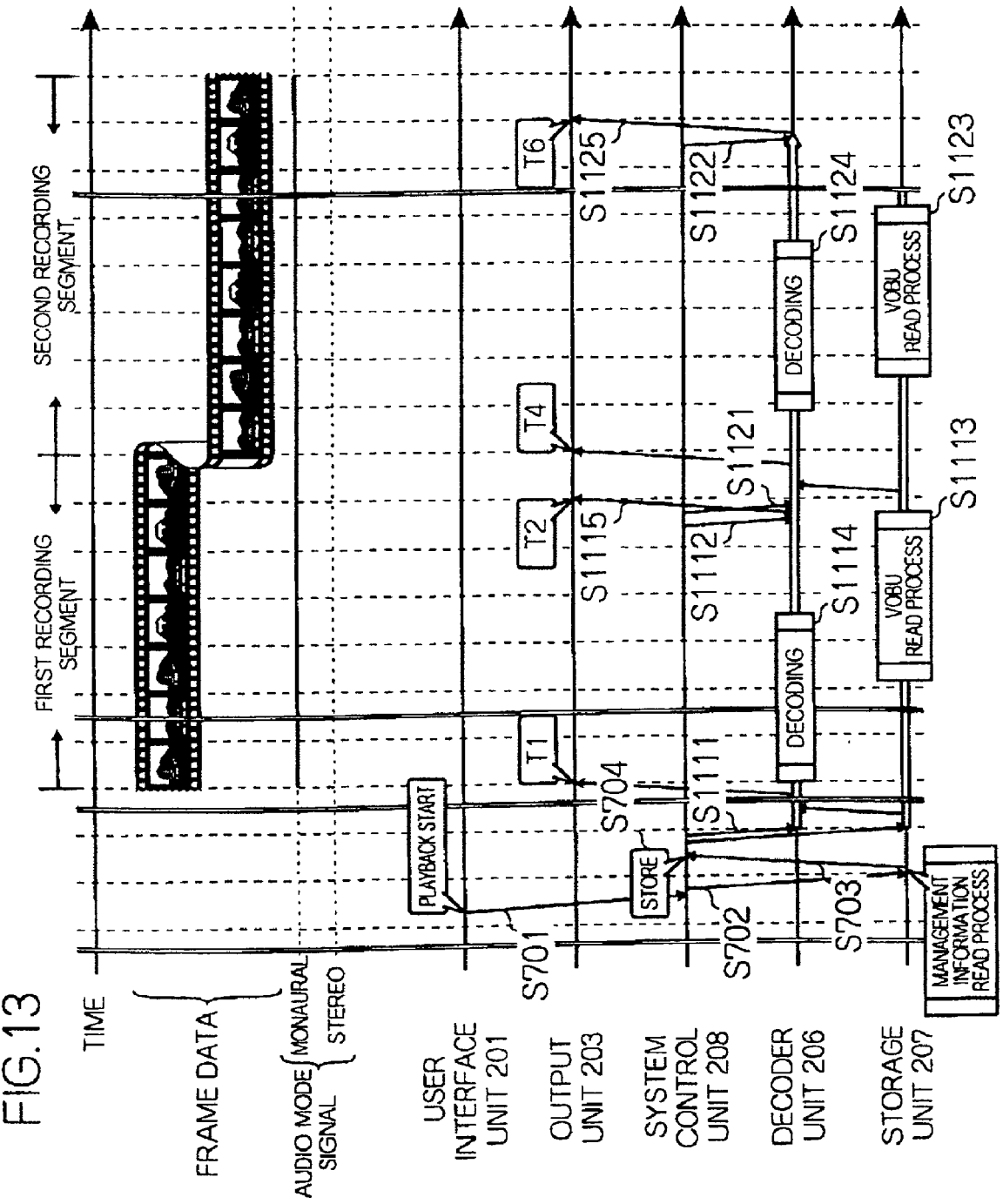
FIG. 13 shows an example of a playback procedure sequence in skip mode.

FIG. 13 shows an example of a playback sequence in skip mode.

The figure shows, starting from the top, frame data to be played back, an audio mode signal, and the constituent features of the digital video recording apparatus 104.

<Start of Playback>

The sequence at the start of playback in the second embodiment is the same as the sequence from steps S701 to S704 in the first embodiment, so an explanation will be omitted.

<First Recording Segment>

Next, the system control unit 208 extracts the cell start time ("T1") and the commercial start time ("T2") in CellI#1 in PGCI#1 from the management information stored in the RAM, and gives a VOBU read instruction to the storage unit 207 and a decode start instruction to the decoder unit 206, based on the extracted cell start time ("T1") and commercial start time ("T2") (step S1111).

Then, the system control unit 208 gives VOBU read instructions to the storage unit 207 for the VOBUs from the cell start time ("T1") to the commercial start time ("T2") in the order that the VOBUs were recorded, has the storage unit 207 read the VOBUs which make up the VOB#1 stored in the recording medium, gives the decoder unit 206 a decode start instruction, and has the decoder unit 206 decode the read VOBUs. Then, the system control unit 208 measures the time that the decoder unit 206 will decode the VOBU corresponding to the commercial start time ("T2"), and gives the decoder a decode stop instruction (step S1112).

The storage unit 207 receives the VOBU read instruction from the system control unit 208, performs a VOBU read procedure, reads the VOBUs that makeup the VOB#1 from the cell playback start time ("T1") to the commercial start time ("T2") in the order in which the VOBUs were recorded, and sends the read VOBUs to the decoder unit 206 (step S1113).

The decoder unit 206 receives the decode start instruction from the system control unit 208, starts decoding, and decodes the VOBUs sent from the storage unit 207 into frame data (step S1114). The decoder unit 206 continues to decode the VOBUs sent from the storage unit 207 and sends the decoded frame data to the output unit 203, until receiving a decode stop instruction from the system control unit 208 (step S1115).

Note that from amongst the decoded frame data, the decoder unit 206 sends frame data up to and including the frame data which corresponds to the commercial start time ("T2").

<Second Recording Segment>

Next, the system control unit 208 extracts the EPI#2 commercial end time ("T4") and the cell playback end time ("T6") in the CellI#2 in the PGCI#1, from the management information stored in the RAM, and sends a VOBU read instruction to the storage unit 207 and a decode start instruction to the decoder unit 206, based on the extracted commercial end time ("T4") and the cell playback end time ("T6") (step S1121).

Then, the system control unit 208 gives VOBU read instructions to the storage unit 207 for the VOBUs from the commercial end time ("T4") to the cell end time ("T6") in the order that the VOBUs were recorded, has the storage unit 207 read the VOBUs which make up the VQB#1 stored in the recording medium, gives the decoder unit 206 a decode start instruction, and has the decoder unit 206 decode the read VOBUs. Then, the system control unit 208 measures the time that the decoder unit 206 will decode the VOBU corresponding to the cell playback end time ("T6"), and gives the decoder a decode stop instruction (step S1122).

The storage unit 207 receives the VOBU read instruction from the system control unit 208, performs a VOBU read procedure, reads the VOBUs that make up the VOB#2 from the commercial end time ("T4") to the cell playback end time ("T6") in the order in which the VOBUs were recorded, and sends the read VOBUs to the decoder unit 206 (step S1123).

Note that the sequence following this is the same as steps S724 to S725 in the first embodiment so an explanation will be omitted.

In this way, in playback in skip mode, the segment from the cell playback start time to the commercial start time (or the commercial end time to the cell playback end time) is the object of playback, meaning that the first recording segment is played back up to the commercial start time ("T2") because of type 2 revision. As a result, playback of the commercial is entirely prevented.

Third Embodiment

<Commercial Cut Recording in Separate Mode>

The following explains the commercial cut recording mode (separate mode) of the digital video recording apparatus 104 in the second embodiment, assuming the user has selected separate mode in advance.

Note that procedures that are the same as the commercial cut recording (cut mode) of the first embodiment have the same reference numbers. The following concentrates on the procedures that differ to the first embodiment.

<Processing of the System Control Unit 208 at the Start of a Commercial>

Figure 14:
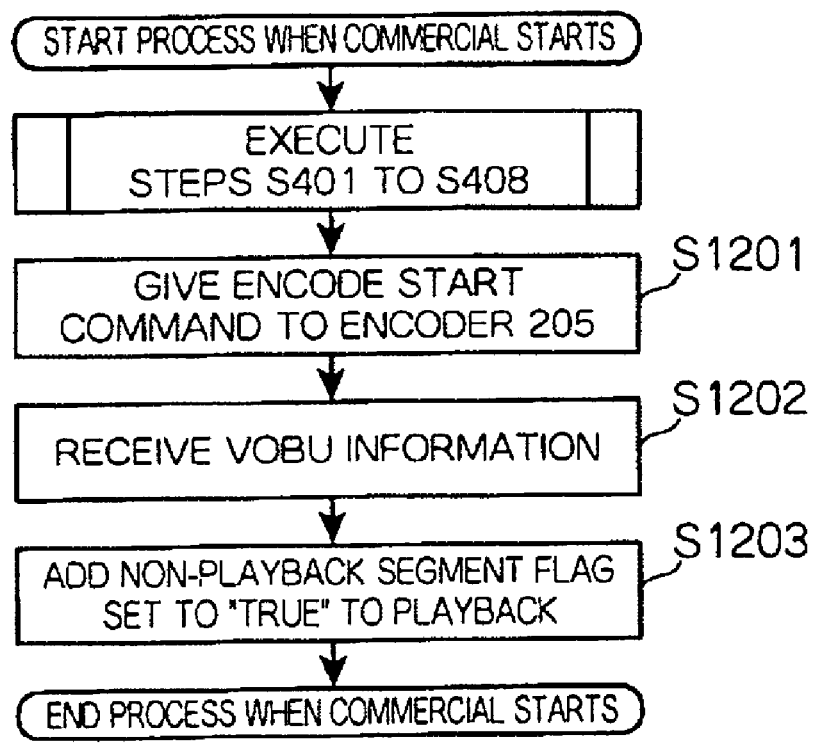
FIG. 14 is a flowchart of the processing of the system control unit when a commercial starts in the third embodiment.

FIG. 14 is a flowchart of the processing of the system control unit 208 at the start of a commercial in the third embodiment.

As can be seen from the flowchart, in addition to steps S401 to S408 of the first embodiment, the third embodiment includes steps S1201 to S1203.

The system control unit 208 gives an encode start instruction to the encoder unit 205 (step S1201), and receives VOBU information sent from the encoder unit 205 (step S1202). The system control unit 208 updates the management information based on the received VOBU information, adding a non-playback segment flag which is set to "TRUE" to the management information (CellI) (step S1203).

<Operation Example of the Commercial Cut Recording Function in Separate Mode>

Figure 15:
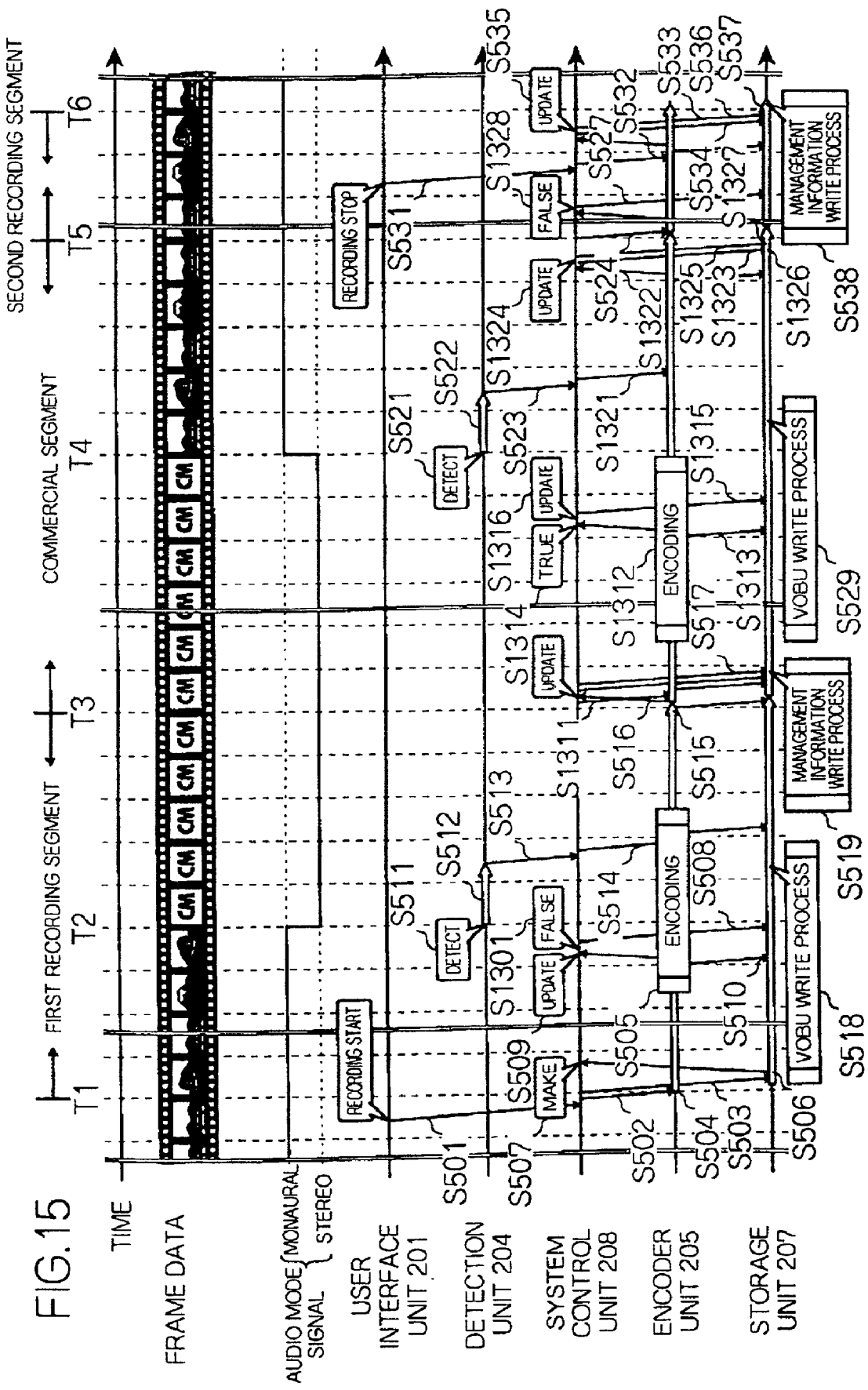
FIG. 15 shows an example of a commercial cut recording sequence in separate mode.

FIG. 15 shows an example of the sequence of the commercial cut recording function in separate mode.

The figure shows, starting from the top, frame data and an audio mode signal received through an antenna, and the constituent features of the digital video recording apparatus 104.

In the following explanation a VOB generated in the first recording segment will be called VOB#1, a VOB generated in the commercial segment will be called VOB#2, and a VOB generated in the third segment will be called VOB#3.

<Start of Recording>

In the third embodiment, the sequence when recording starts has an additional step S1301 before step S508. The remainder of the sequence is the same as steps S501 to S510 of the first embodiment, so an explanation will be omitted.

The system control unit 208 receives the first VOBU information sent from the encoder unit 205, and adds a non-playback segment flag which is set to "FALSE" to the management information (step S1301).

<Start of a Commercial>

In the third embodiment, the sequence when a commercial starts includes, in addition to steps S511 to S519 of the first embodiment, steps S1311 to S1316. Note that an explanation of steps S511 to S519 of the first embodiment will be omitted.

The system control unit 208 gives an encode start instruction to the encoder unit 205 (step S1311).

The encoder unit 205 receives the encode start instruction from the system control unit 208, starts encoding, and generates a new VOB (step S1312). The encoder unit 205 continues to generate VOBUs which make up the new VOB, send the generated VOBUs to the storage unit 207, and send VOBU information about the generated VOBUs to the system control unit 208, until receiving an encode stop instruction from the system control unit 208 (step S1313).

The system control unit 208 receives the VOBU information sent from the encoder unit 205, and adds a non-playback segment flag "TRUE" to the cell information in the management information (step S1314). The system control unit 208 gives a VOBU write instruction to the storage unit 207 each time it receives VOBU information sent from the encoder unit 205 (step S1315). Then, the system control unit 208 updates the management information based on the received VOBU information (step S1316).

<End of a Commercial>

In the third embodiment, the sequence when a commercial ends has additional step S1321 to S1327 before step S524.

The system control unit 208 receives notification from the detection unit 204 that the commercial has ended, and gives an encode stop instruction to the encoder unit 205 (step S1321)

The encoder unit 205 receives the encode stop instruction from the system control unit 205, stops encoding, and sends generated VOBUs to the storage unit 207 and VOBU information about the generated VOBUs to the system control unit 208 (step S1322).

The system control unit 208 receives the VOBU information sent from the encoder unit 205, and gives a VOBU write instruction to the storage unit 207 (step S1323). Then, the system control unit 208 updates the management information, based on the received VOBU information (step S1324), and sends the updated management information and a management information write instruction to the storage unit 207 (step S1325).

The storage unit receives the VOBU write instruction from the system control unit 208, executes a VOBU write procedure, and stores the VOBUs sent from the encoder unit 205 in the recording medium (step S1326). Then, the storage unit 207 receives the management information write instruction from the system control unit 208, executes a management information write procedure, and stores the received management information in the recording medium as a management information file (step S1327).

In addition, there is the following step S1328 before step S527. The remainder is the same is steps S512 to S529 in the first embodiment, so an explanation will be omitted.

The system control unit 208 receives the first VOBU sent from the encoder unit 205, and adds a non-playback segment flag "FALSE" to the management information (step S1328).

<End of Recording>

In the third embodiment, the sequence at the end of recording is the same as steps S531 to S538 shown in the first embodiment, so an explanation will be omitted.

<Specific Example of Management Information>

Figure 16:
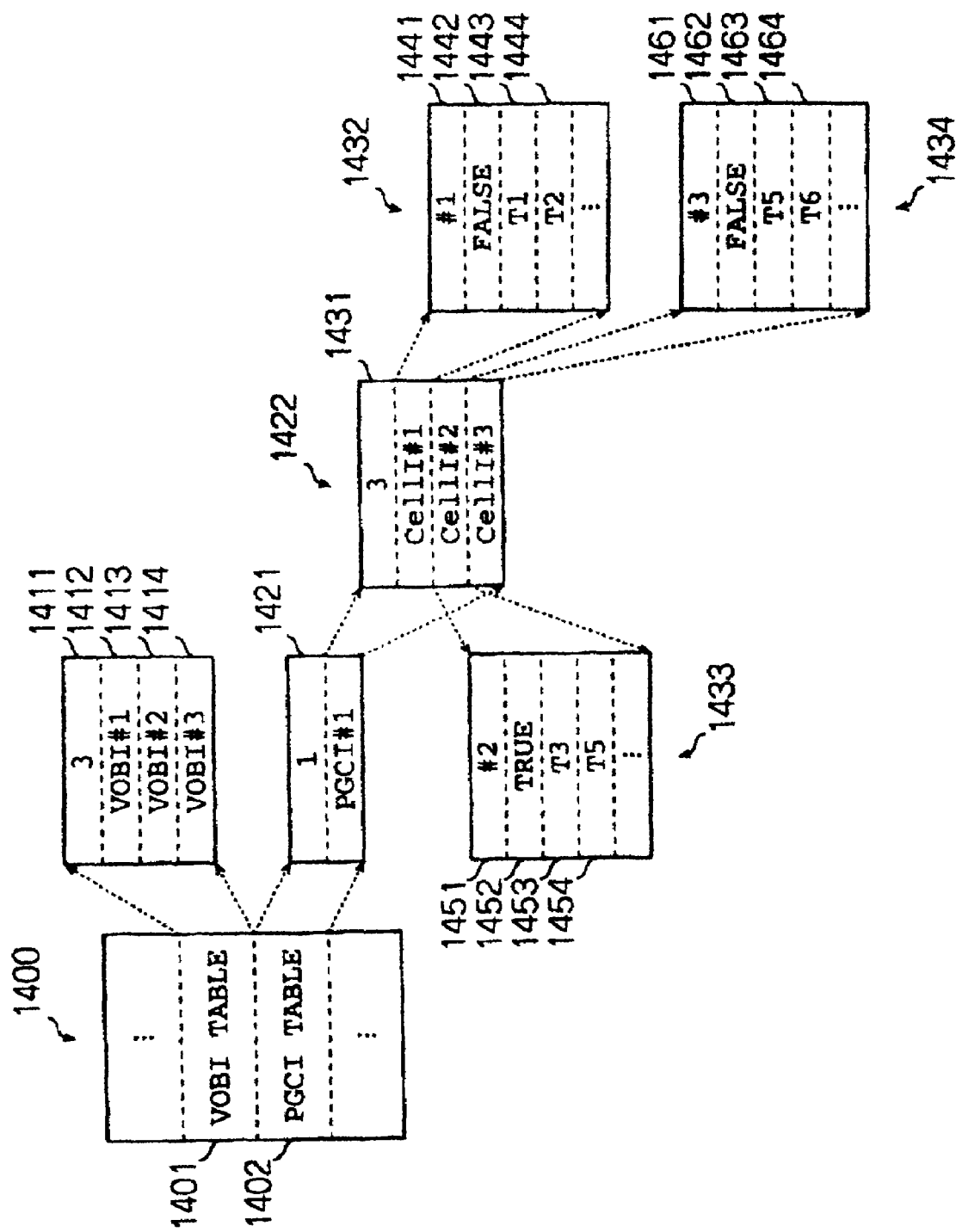
FIG. 16 shows an example of management information data made by the system control unit in a commercial cut recording sequence in separate mode.

FIG. 16 shows a specific example of management information data generated by the system control unit 208 in commercial cut recording in separate mode.

As can be seen from the figure, management information 1400 includes a VOBI table 1401, and a PGCI table 1402.

The VOBI table 1401 is composed of a field 1411, a table 1412, a table 1413, and a table 1414.

A number "3" which is the number of VOBIs stored in the VOBI table 1401 is stored in the field 1411.

VOBI "VOBI#1" about the VOB#1 is stored in the table 1412.

VOBI "VOBI#2" about the VOB#2 is stored in the table 1413.

VOBI "VOBI#3" about the VOB#3 is stored in the table 1414.

The PGCI table 1402 is composed of a field 1421, and a table 1422.

A number "1" which is the number of PGCIs stored in the PCGI table 1402 is stored in the field 1421.

PGCI "PGCI#1" which was generated in one recording operation is stored in the table 1422.

The table 1422 is composed of a field 1431, a table 1432, a table 1433, and a table 1434.

A number "3" which is the number of CellI stored in the table 1422 is stored in the field 1431.

CellI "CellI#1" which corresponds to the VOB#1 is stored in the table 1432.

CellI "CellI#2" which corresponds to the VOB#2 is stored in the table 1433.

CellI "CellI#3" which corresponds to the VOB#3 is stored in the table 1434.

The table 1432 includes a field 1441, a field 1442, a filed 1443, and a field 1444.

A search pointer (reference number) "#1" for the VOBI#1 is stored in the field 1441.

"FALSE" which shows that a segment is a playback segment is stored in the field 1442.

A cell playback start time "T1" is stored in the field 1443.

A cell playback end time "T2" is stored in the field 1443.

The table 1433 includes a filed 1451, a field 1452, a field 1453, and a field 1454.

A search pointer (reference number) "#2" for the VOBI#2 is stored in the field 1451.

"TRUE" which shows that a segment is a non-playback segment is stored in the field 1452.

A cell playback start time "T3" is stored in the field 1453.

A cell playback end time "T5" is stored in the field 1454.

The table 1434 includes a field 1461, a field 1462, a field 1463, and a field 1464.

A search pointer (reference number) "#3" for the VOBI#3 is stored in the field 1461.

"FALSE" which shows that a segment is a playback segment is stored in the field 1462.

A cell playback start time "T5" is stored in the field 1463.

A cell playback end time "T6" is stored in the field 1464.

The control management information included in the management information 1400 is the information stored in the fields 1442, 1444, 1453, and 1462.

<Playback Procedure>

Next, playback of a broadcast recorded by commercial cut recording (separate mode) will be explained.

Figure 17:
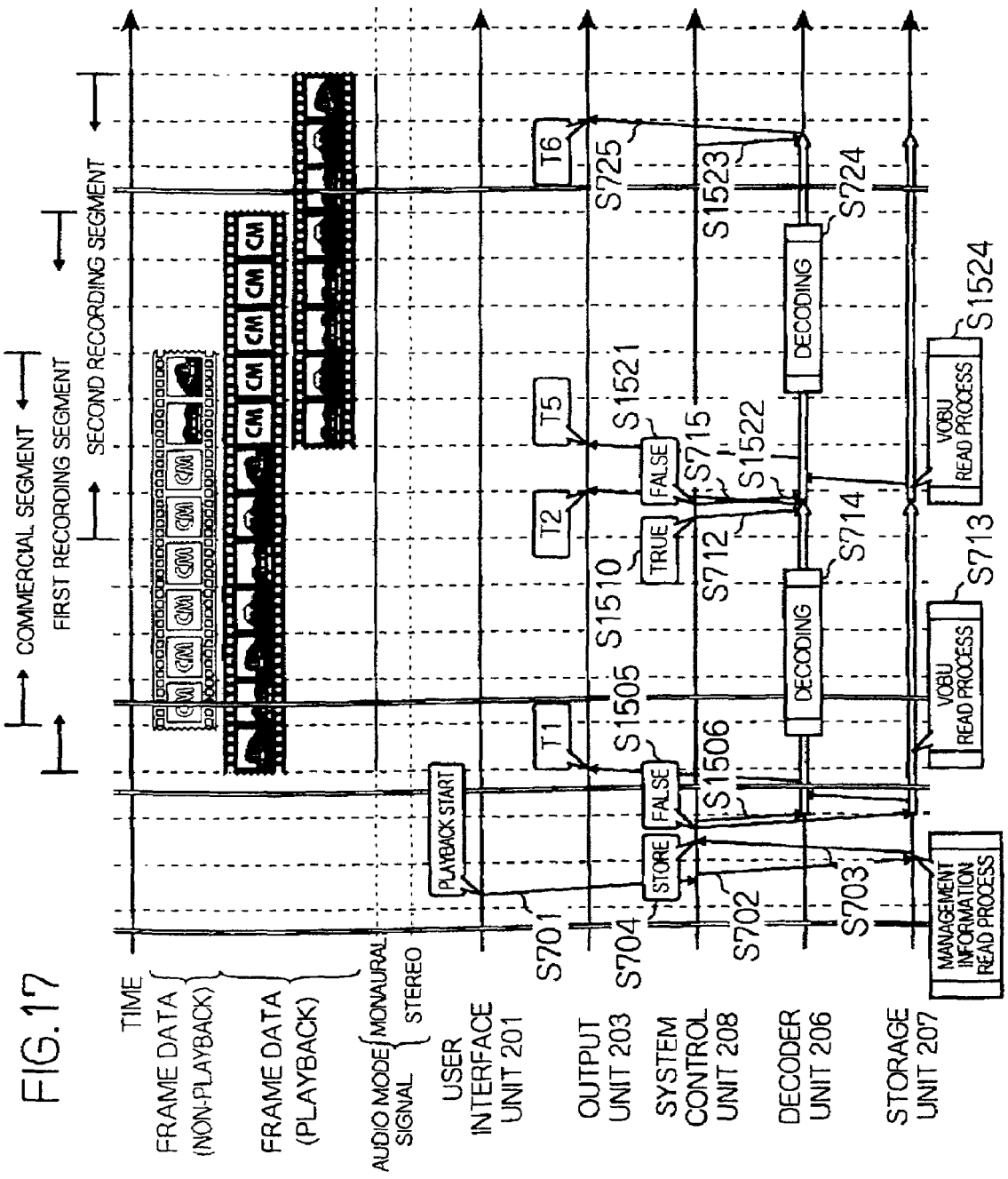
FIG. 17 shows an example of a playback sequence in separate mode.

FIG. 17 shows an example of a playback sequence in separate mode.

The figure shows, starting from the top, frame data to be played back and an audio mode signal, and the constituent features of the digital video recording apparatus 104.

<Start of Playback>

In the third embodiment the sequence at the start of playback is the same as steps S701 to S704, so an explanation will be omitted.

<First Recording Segment>

Next, the system control unit 208 extracts the non-playback segment flag, the cell playback start time ("T1"), and the cell playback end time ("T2") in the CellI#1 in the PGCI#1 from the management information stored in the RAM, and judges the extracted non-playback segment flag (step S1505). As the result of the judgement is that the extracted non-playback segment flag is "FALSE", the system control unit 208 gives a VOBU read instruction to the storage unit 207 and a decode start instruction to the decoder unit 206, based on the extracted cell playback start time T1 and the cell playback end time T2 (step S1506).

Following this the sequence is the same as steps S711 to S715 in the first embodiment, so an explanation will be omitted.

<Commercial Segment>

Next, the system control unit 208 extracts the non-playback segment flag, the cell playback start time ("T3"), and the cell playback end time ("T5") in the CellI#2 in the PGCI#1 from the management information stored in the RAM, and judges the extracted non-playback segment flag (step S1510). As the result of the judgement is that the extracted non-playback segment flag is "TRUE", the system control unit 208 does not play back the VOB#2, but proceeds to a playback procedure for the VOB#3.

<Second Recording Segment>

Next, the system control unit 208 extracts the non-playback segment flag, the cell playback start time ("T5"), and the cell playback end time ("T6") in the CellI#3 in the PGCI#1 from the management information stored in the RAM, and judges the extracted non-playback segment flag (step S1521). As the result of the judgement is that the extracted non-playback segment flag is "FALSE", the system control unit 208 gives s VOBU read instruction to the storage unit 207 and a decode start instruction to the decoder unit 206, based on the extracted cell playback start time ("T5") and the cell playback end time ("T6") (step S1522).

Then, the system control unit 208 gives VOBU read instructions to the storage unit 207 for the VOBUs from the cell playback start time ("T5") to the cell playback end time ("T6") in the order that the VOBUs were recorded, has the storage unit 207 read the VOBUs which make up the VOB#3 stored in the recording medium, gives the decoder unit 206 a decode start instruction, and has the decoder unit 206 decode the read VOBUs. Then, the system control unit 208 measures the time that the decoder unit 206 will decode the VOBU corresponding to the cell playback end time ("T6"), and gives the decoder a decode stop instruction (step S1523).

The storage unit 207 receives the VOBU read instructions from the system control unit 208, performs VOBU read procedures, reads the VOBUs that makeup the VOB#1 from the cell playback start time ("T5") to the cell playback end time ("T6") in the order in which the VOBUs were recorded, and sends the read VOBUs to the decoder unit 206 (step S1515).

Following this the sequence is the same as in steps S724 to S725 in the first embodiment, so an explanation will be omitted.

In this way, in playback in separate mode, the non-playback segment flag is "FALSE" and the segment from the cell playback start time to the cell playback end time is played back, meaning that because of the type 1 revision procedure, the first recording segment is played back up to the cell playback end time ("T2"). In addition, the non-playback flag is "TRUE" in the commercial segment, so this segment is not played back. As a result, playback of the commercial is entirely prevented.

Fourth Embodiment

<Commercial Cut Recording Function in Second Skip Mode>

The following explains the commercial cut recording mode (second skip mode) of the digital video recording apparatus 104 in the second embodiment, assuming the user has selected the second skip mode in advance.

Note that procedures that are the same as the commercial cut recording (skip mode) of the second embodiment have the same reference numbers. The following concentrates on the procedures that differ to the second embodiment.

Furthermore, the only point that differs between the playback procedure in the fourth embodiment and that in the second embodiment is the commercial start time and the commercial end time, so an explanation will be omitted.

<Processing of the System Control Unit when a Commercial Starts>

Figure 18:
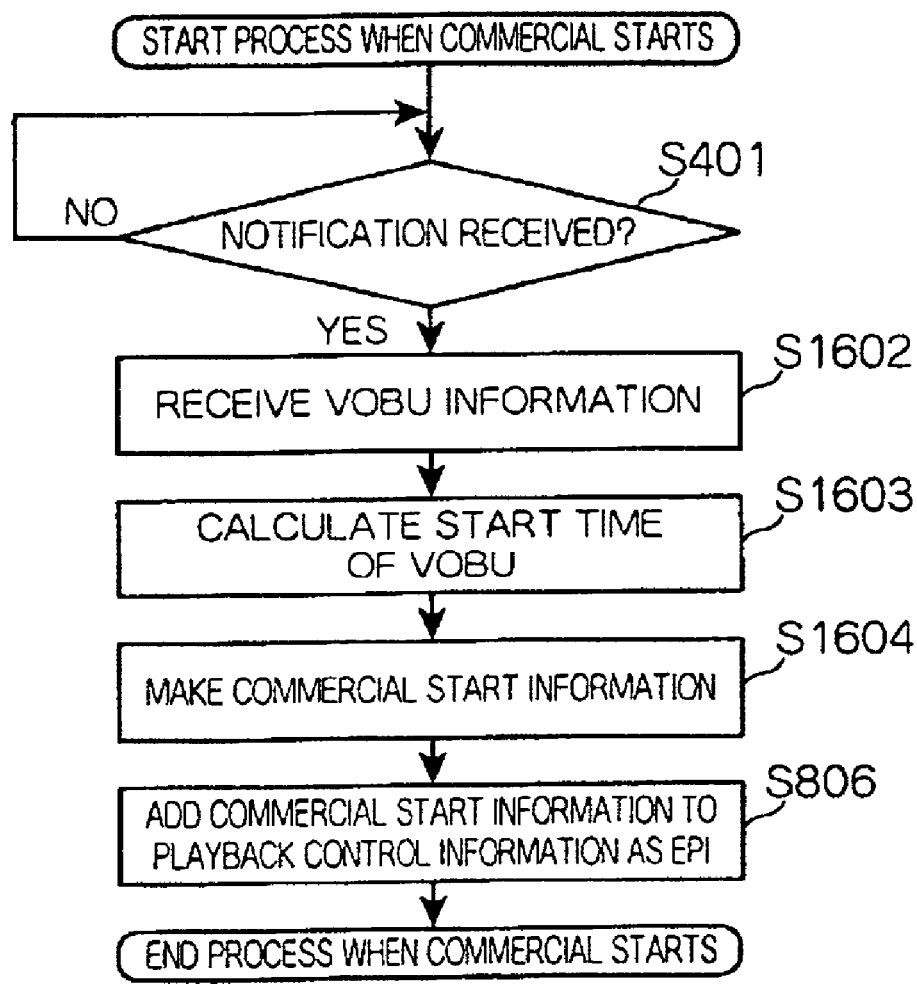
FIG. 18 is a flowchart of the processing of the system control unit when a commercial starts in the fourth embodiment.

FIG. 18 is a flowchart showing the procedure of the system control unit 208 when a commercial starts in the fourth embodiment.

As can be seen from the flowchart, the system control unit 208 receives notification of the start of a commercial from the detection unit 204 (step S401), receives VOBU information sent from the encoder unit 205 (step S1602), and calculates the start time of the VOBU from the received notification, based on the received VOBU (step S1603). Then the system control unit 208 makes commercial start information which includes the calculated VOBU start time and text information showing the start of the commercial (step S1604), and adds the commercial start information as EPI to the management information (step S806).

Note that the process at the end of a commercial is performed in a similar manner to that at the start. Namely, the system control unit 208 makes commercial end information which includes the calculated VOBU start time and text information showing the end of the commercial, and adds the commercial end information as EPI to the management information.

<Operation Example of Commercial Cut Recording Function in Second Skip Mode>

Figure 19:
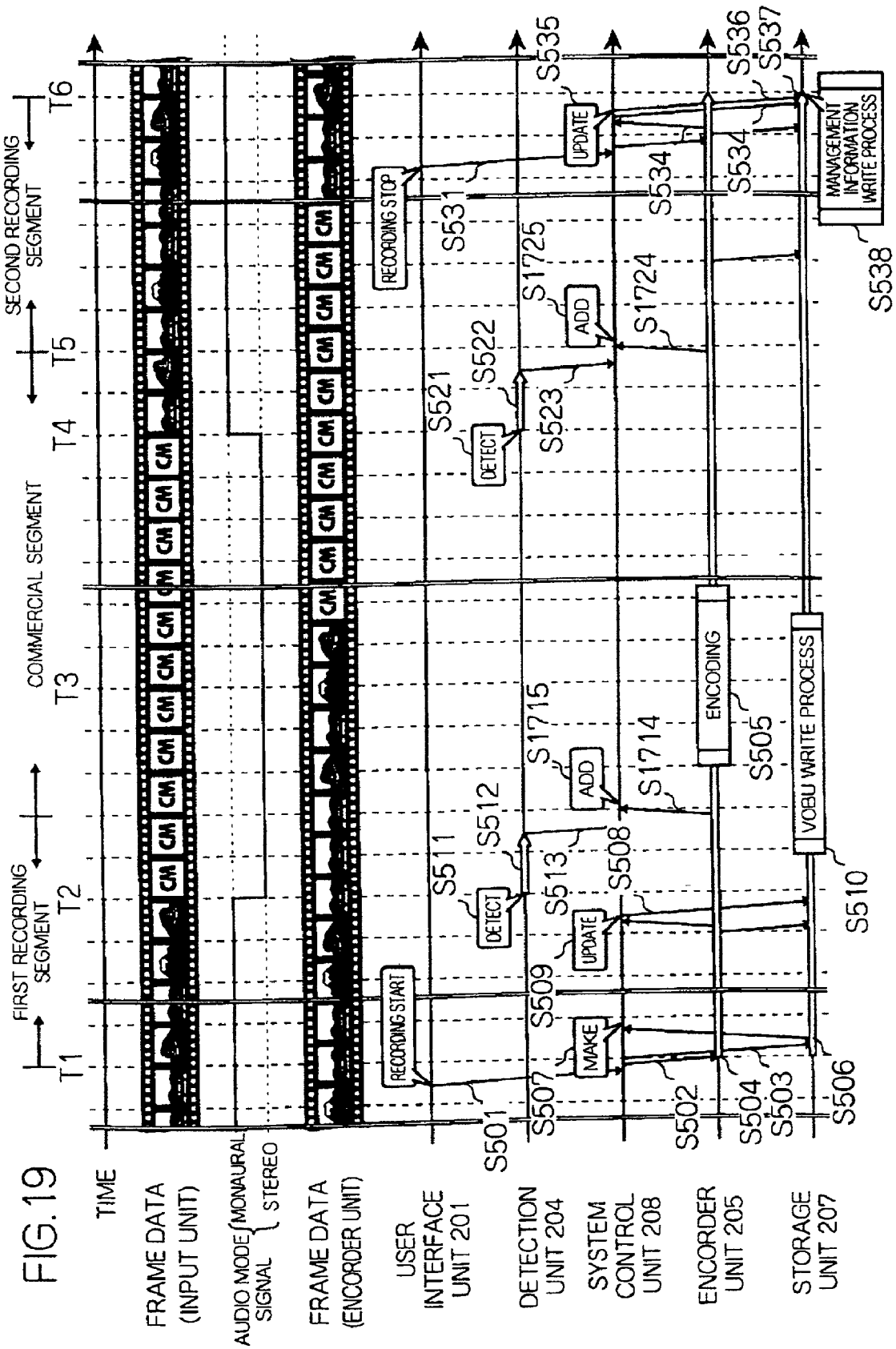
FIG. 19 shows an example of a commercial cut recording playback sequence in second skip mode.

FIG. 19 shows an example of a commercial cut recording sequence in second skip mode.

The figure shows, starting from the top, frame data and an audio mode signal received through an antenna, frame data to be encoded, and the constituent features of the digital video recording apparatus 104.

<Start of Recording>

In the fourth embodiment the sequence when recording starts is the same as that in the first embodiment from steps S501 to S510, so an explanation of these step will be omitted, <Start of Commercial>

In the fourth embodiment the sequence when a commercial starts has steps S1714 to S1715 instead of steps S914 to S916 in the second embodiment.

The system control unit 208 receives notification from the detection unit 204 that a commercial has started, and receives VOBU information sent from the encoder (step S1714), then calculates the start time of the VOBU from the notification of the start of the commercial, based on the received VOBU information. Next, the system control unit 208 makes commercial start information which includes the calculated VOBU start time and text information showing the start of the commercial, and adds the commercial start information as EPI to the management information (step S1715).

<End of the Commercial>

In the fourth embodiment the sequence at the end of the commercial has step S1724 to S1725 instead of steps S924 to S926 in the second embodiment.

The system control unit 208 receives notification from the detection unit 204 that a commercial has ended, and receives VOBU information sent from the encoder (step S1724), then calculates the start time of the VOBU from the notification of the end of the commercial, based on the received VOBU information. Next, the system control unit 208 makes commercial end information which includes the calculated VOBU start time and text information showing the end of the commercial, and adds the commercial end information to the management information as EPI (step S1725).

<End of Recording>

In the first embodiment the sequence when recording ends is the same as that in steps S531 to S538 in the second embodiment so an explanation will be omitted.

<Specific Example of Management Information>

Figure 20:
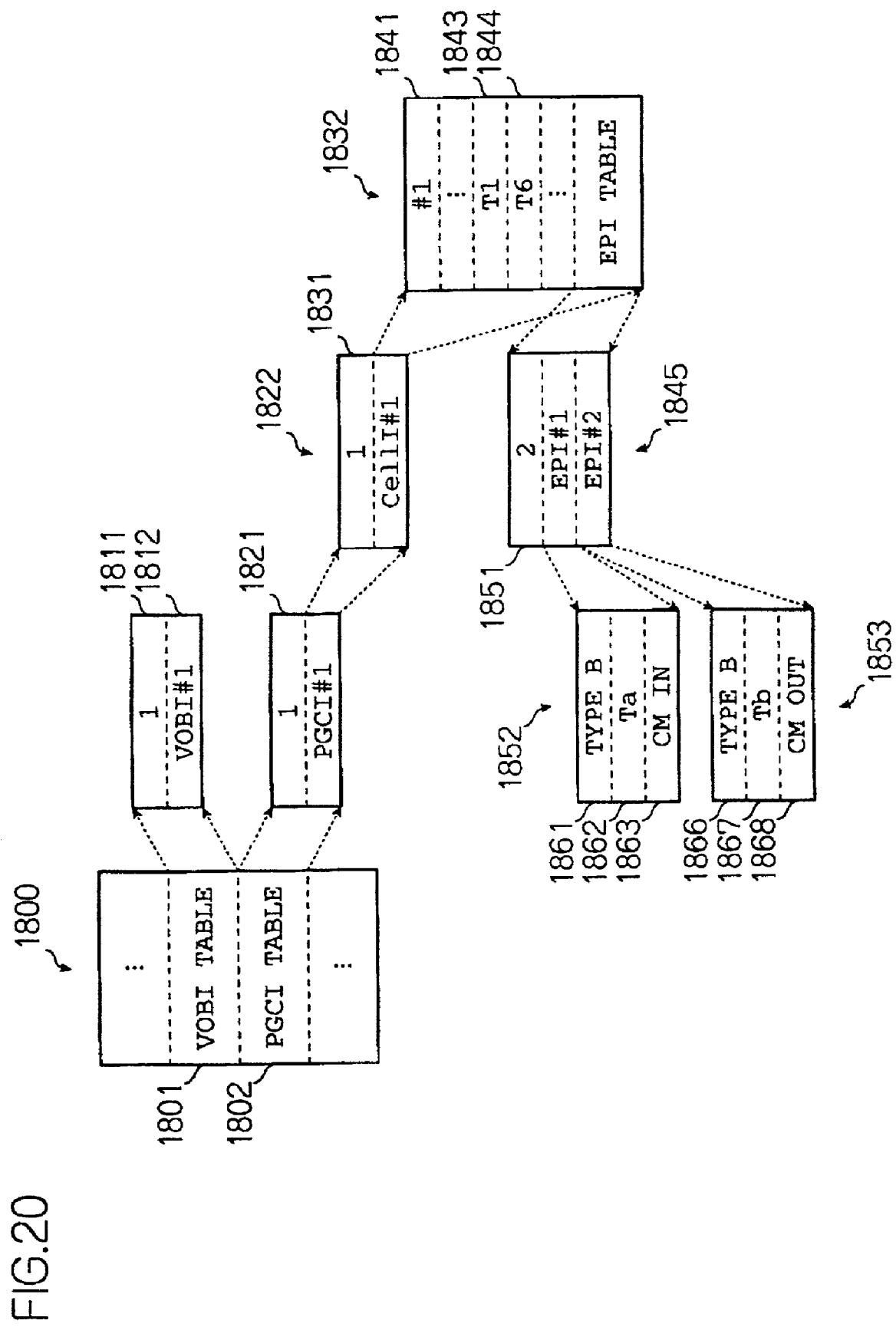
FIG. 20 shows an example of management information data made by the system control unit in a commercial cut recording sequence in second skip mode.

FIG. 20 shows an example of management information data made by the system control unit 208 in commercial cut recording in second skip mode.

As the figure shows, management information 1800 includes a VOBI table 1801, and a PGCI table 1802.

The VOBI table 1801 is composed of a field 1811, and a table 1812.

A number "1" that is the number of VOBIs stored in the VOBI table 1801 is stored in the field 1811.

VOBI about the VOB#1 "VOBI#1" is stored in the table 1812.

The PGCI table 1802 is composed of a field 1821 and a table 1822.

A number "1" that is the number of PGCIs stored in the PGCI table 1802 is stored in the field 1821.

PGCI "PGCI#1" generated in one recording operation is stored in the table 1822.

The table 1822 is composed of a field 1831, a table 1832.

A number "1" that is the number of CellIs stored in the table 1822 is stored in the field 1831.

CellI "CellI#1" corresponding to the VOB#1 is stored in the table 1832.

The table 1832 also includes a field 1841, a field 1843, a field 1844, and a table 1845.

A search pointer (reference number) "#1" for VOBI#1 is stored in the field 1841.

A cell playback start time "T1" is stored in the field 1843.

A cell playback end time "T6" is stored in the field 1844.

An EPI table is stored in the table 1845.

The EPI table 1845 is composed of a field 1851, a record 1852, and a record 1853.

A number "2" that is the number of EPIs stored in the table 1845 is stored in the field 1851.

EPI "EPI#1" in which the commercial start information is stored is stored in the record 1852.

EPI "EPI#2" in which the commercial end information is stored is stored in the record 1853.

The record 1852 is also composed of a field 1861, a field 1862, and a field 1863.

A type "TYPE B" of the EPI is stored in the field 1861.

A start time "Ta" of the VOBU from receiving notification of the start of the commercial is stored in the field 1862.

Text information "CM IN" which shows the start of the commercial is stored in the field 1863.

The record 1853 is also composed of a field 1866, a field 1867, and a field 1868.

A type "TYPE B" of the EPI is stored in the field 1866.

A start time "Tb" of the VOBU from receiving notification of the end of the commercial is stored in the field 1867.

Text information "CM OUT" which shows the end of the commercial is stored in the field 1868.

The playback control information included in the management information 1800 is the information recorded in the records 1852, and 1853.

Fifth Embodiment

The following explains a digital video recording apparatus of the fifth embodiment, with a focus on constituent features which differ from the digital video recording apparatus of the second embodiment.

<Structure Which Differs from the Digital Video Recording Apparatus 104>

Figure 21:
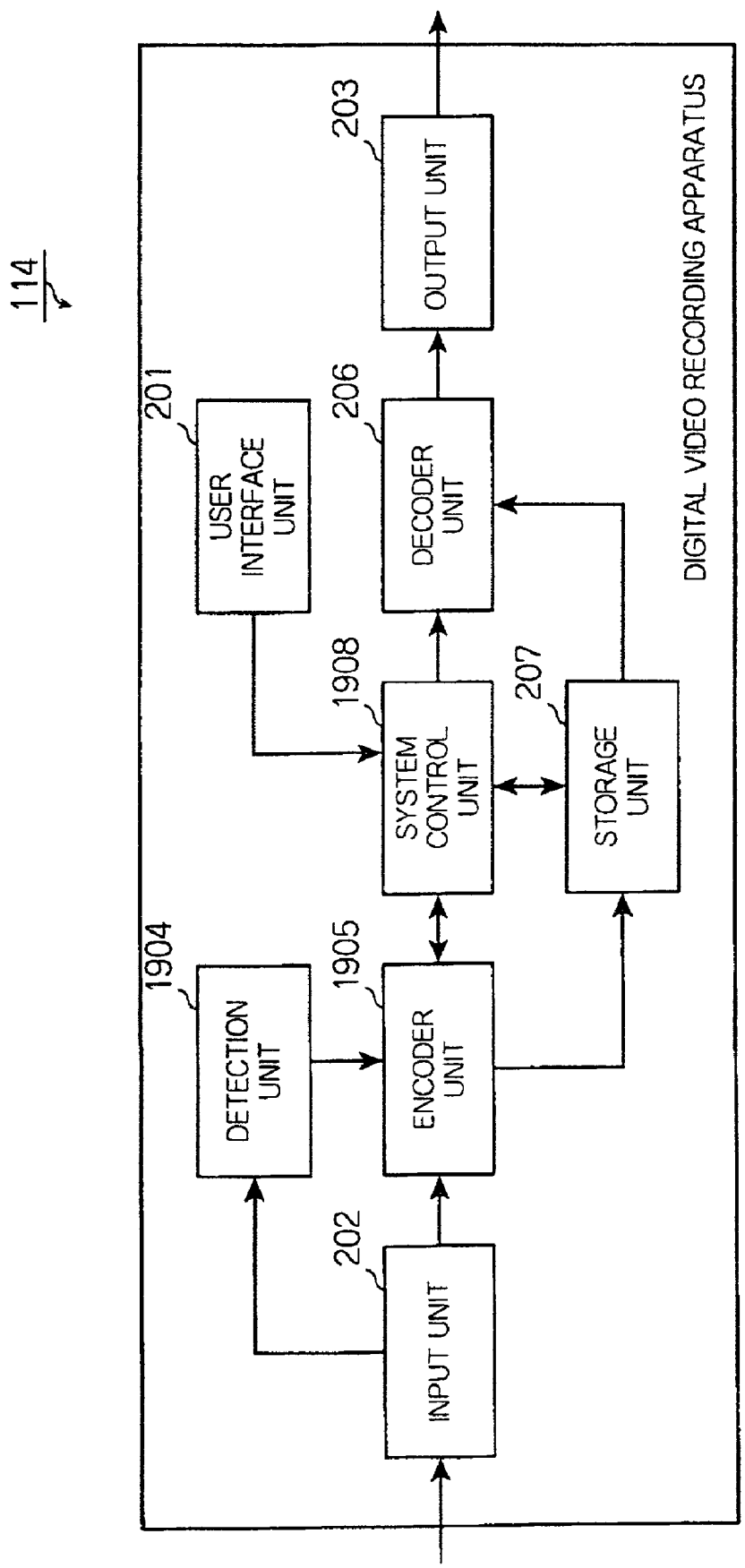
FIG. 21 is a function block drawing of the digital recording apparatus in the fifth embodiment.

FIG. 21 shows function blocks of the digital recording apparatus of the fifth embodiment.

As shown in the figure, a digital video recording apparatus 114 has a detection unit 1904, and encoder unit 1905, and a system control unit 1908 instead of the detection unit 204, the encoder unit 205, and the system control unit 208 of the digital video recording apparatus 104.

The detection unit 1904 notifies the encoder unit 1905 of the start (or the end) of a commercial, compared to the detection unit 204 which notifies the system control unit 208.

Unlike the encoder unit 205, the encoder unit 1905 receives notification of the start (or the end) of a commercial from the detection unit 1904, calculates the start (or end) time of the commercial from the time code of the next frame data that is encoded, makes commercial start (or end) information which includes the calculated commercial start (or end) time and text information showing the start (or end) of the commercial, and adds the commercial start (or end) information to the VOBU information.

Here, the commercial start time (CM_S_PTM) shows a time calculated from the time code (Time_code), encoding time(Encode_Time), and the (Time_Lag), based on Expression 3.

Expression 3: CM_S_PTM=Time_Code+Encode Time−Time_Lag

Here, time lag (Time_Lag) is the time required from when the detection unit 1904 detects the start (or end) of a commercial until it the encoder unit 205 receives notification of the start (or end) of the commercial.

Here, encoding time is the time required for the pictures that make up a VOBU to be generated by encoding input frame data.

Note that the commercial end time (CM_E_PTM) is calculated in the same way is the commercial start time (CM_S_PTM), based on Expression 4.

Expression 4. CM_E_PTM=Time_Code+Encode Time−Time_Lag

The system control unit 1908 differs from the system control unit 208 in that it adds commercial start (or end) information included in VOBU information sent from the encoder unit 1905, to the management information as EPI.

<Operation of the Digital Video Recording Apparatus 114>

The following is an explanation of the operation of the digital video recording apparatus 114 with the above-described structure.

<Commercial Cut Recording Function in Skip Mode>

The following explains the commercial cut recording mode (skip mode) of the digital video recording apparatus 114 in the fifth embodiment, assuming the user has selected the skip mode in advance.

Note that procedures that are the same as the commercial cut recording (cut mode) of the first embodiment have the same reference numbers. The following concentrates on the procedures of the fifth embodiment that differ from the first embodiment.

Figure 22:
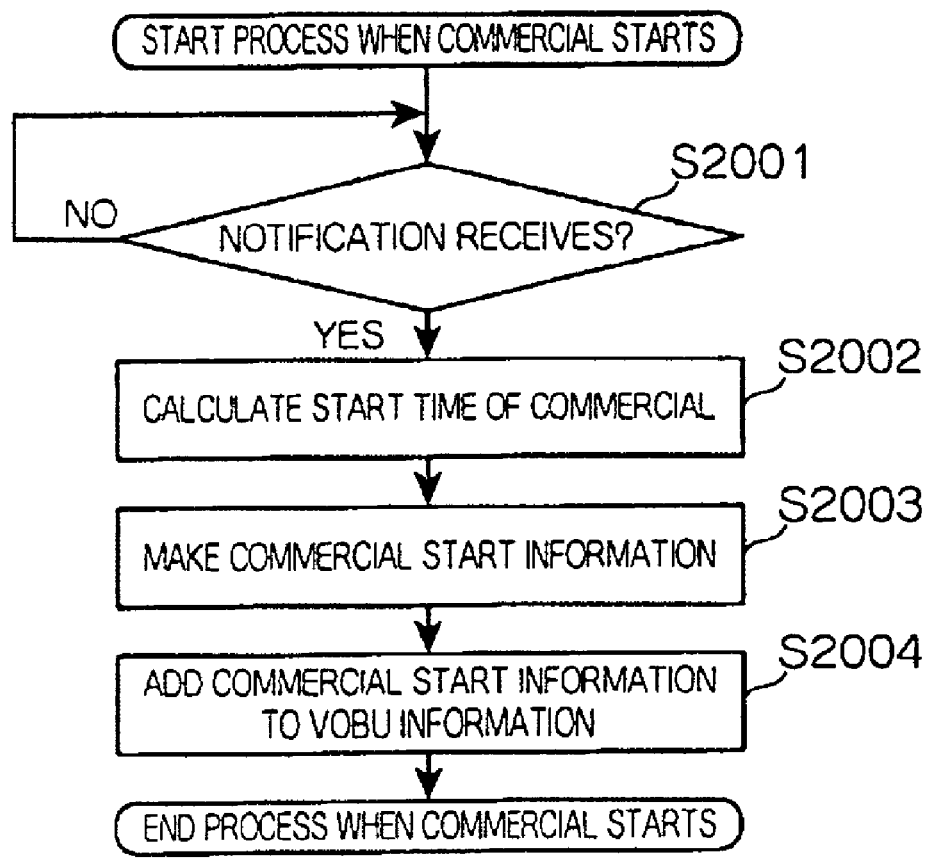
FIG. 22 is a flowchart of the processing of the encoder when a commercial starts in the fifth embodiment.

FIG. 22 is a flowchart showing the processing of the encoder unit 1905 when a commercial starts in the fifth embodiment.

As shown in the figure, the encoder unit 1905 receives notification from the detection unit 1904 that a commercial has started (step S2001), calculates the commercial start time based on Expression 3 (step S2002), makes commercial start time information which includes the calculated commercial start time and text information showing the start of he commercial (step S2003), and adds the commercial start information to the VOBU information (step S2004).

Note that the encoder unit 1905, in the same way as the process when the commercial starts, when the commercial ends makes commercial end time information which includes the calculated commercial end time and text information showing the end of he commercial, and adds the commercial end information to the VOBU information.

<Operation Example of the Commercial Cut Recording Function in Skip Mode>

Figure 23:
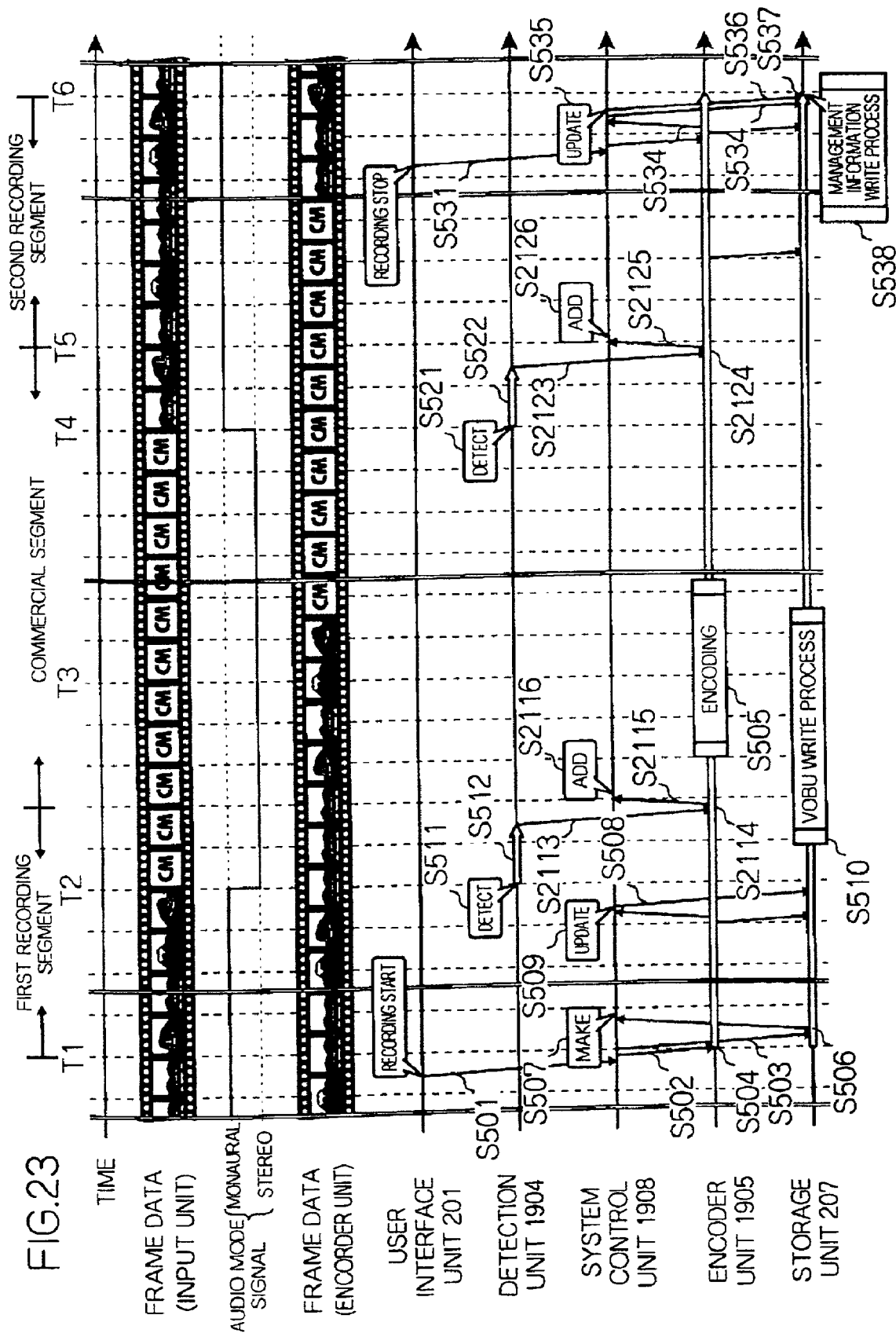
FIG. 23 shows an example of a commercial cut recording sequence in skip mode.

FIG. 23 shows an example of a commercial cut recording sequence in skip mode.

The figure shows, starting from the top, frame data and an audio mode signal received through an antenna, frame data to be encoded, and the constituent features of the digital video recording apparatus 114, In the following a VOB which is generated through the first recording segment, the commercial segment, and the second recording segment will be called VOB#1.

<Start of Recording>

In the fifth embodiment the sequence when recording starts is the same as that in steps S501 to S510 in the first embodiment, so an explanation will be omitted.

<Start of a Commercial>

In the fifth embodiment the sequence when a commercial starts differs from the first embodiment in that it has steps S2113 to S2116 instead of steps S513 to S517. Note that an explanation of steps S511 to S512 of the first embodiment will be omitted.

The detection unit 1904 notifies the encoder unit 1905 that a commercial has started, after confirming that stereo sound continues (step S2113).

The encoder unit 1905 receives notification of the start of the commercial from the detection unit 1904 and calculates the start time of the commercial based on Expression 3, from the time code of the next frame data that is encoded. Then, the encoder unit 1905 makes commercial start information which includes the calculated commercial start time and text information showing the start of the commercial, and adds the commercial start information to the VOBU information (step S2114).

The system control unit 1908 receives the VOBU information (which includes the commercial start information) sent from the encoder unit 1905, and gives a VOBU write instruction to the storage unit 207 (step 2115). In addition, the system control unit 1908 updates the management information, based on the received VOBU information. At this time, the commercial start time included in the VOBU information is added to the management information as EPI. Then, the system control unit 1908 sends the updated management information to the storage unit 207, and gives a management information write instruction to the storage unit 207 (step S2116).

The sequence following this is the same as step S518 to S519 in the first embodiment, so an explanation will be omitted.

<End of the Commercial>

In the fifth embodiment, the sequence when the commercial ends differs from the first embodiment in that it has steps S2123 to S2126 instead of steps S523 to S527. Note that an explanation of steps 3521 to S522 of the first embodiment will be omitted.

The detection unit 1904 sends notification to the encoder unit 1905 that the commercial has ended, after confirming that monaural sound continues (step S2123).

The encoder unit 1905 receives notification from the detection unit 1904 that the commercial had finished, and calculates a commercial end time from the time code in the next frame data that is encoded, based on Expression 4. Then, the detection unit 1904 makes commercial end information which includes the calculated commercial end time and text information showing the end of the commercial, and adds the commercial end information to the VOBU information (step S2124).

The system control unit 1908 receives the VOBU information (which includes the commercial end information) sent from the encoder unit 1905, and gives a VOBU write instruction to the storage unit (step S2125) Then, the system control unit 1908 updates the management information based on the received VOBU. As this time, the commercial end information included in the VOBU is added to the management information as EPI. Next, the system control unit 1908 sends the updated management information to the storage unit 207, and gives a management information write instruction to the storage unit 207 (step S2126).

The following sequence is the same as steps S528 to S529 in the first embodiment, so an explanation will be omitted.

<End of Recording>

In the fifth embodiment, the sequence when recording ends is the same as steps S531 to S538, therefore an explanation will be omitted.

Note that in the sequence in the commercial cut recording in skip mode, the management information made by the system control unit 1908 is the same as the management information 1000 in the second embodiment, so an explanation will be omitted.

In addition, the playback procedure is the same as the playback procedure in the second embodiment, so an explanation will be omitted Sixth Embodiment The following explains a digital video recording apparatus of the sixth embodiment, with a focus on constituent features which differ from the digital video recording apparatus of the fifth embodiment.

<Structure Which Differs from the Digital Video Recording Apparatus 114>

Figure 24:
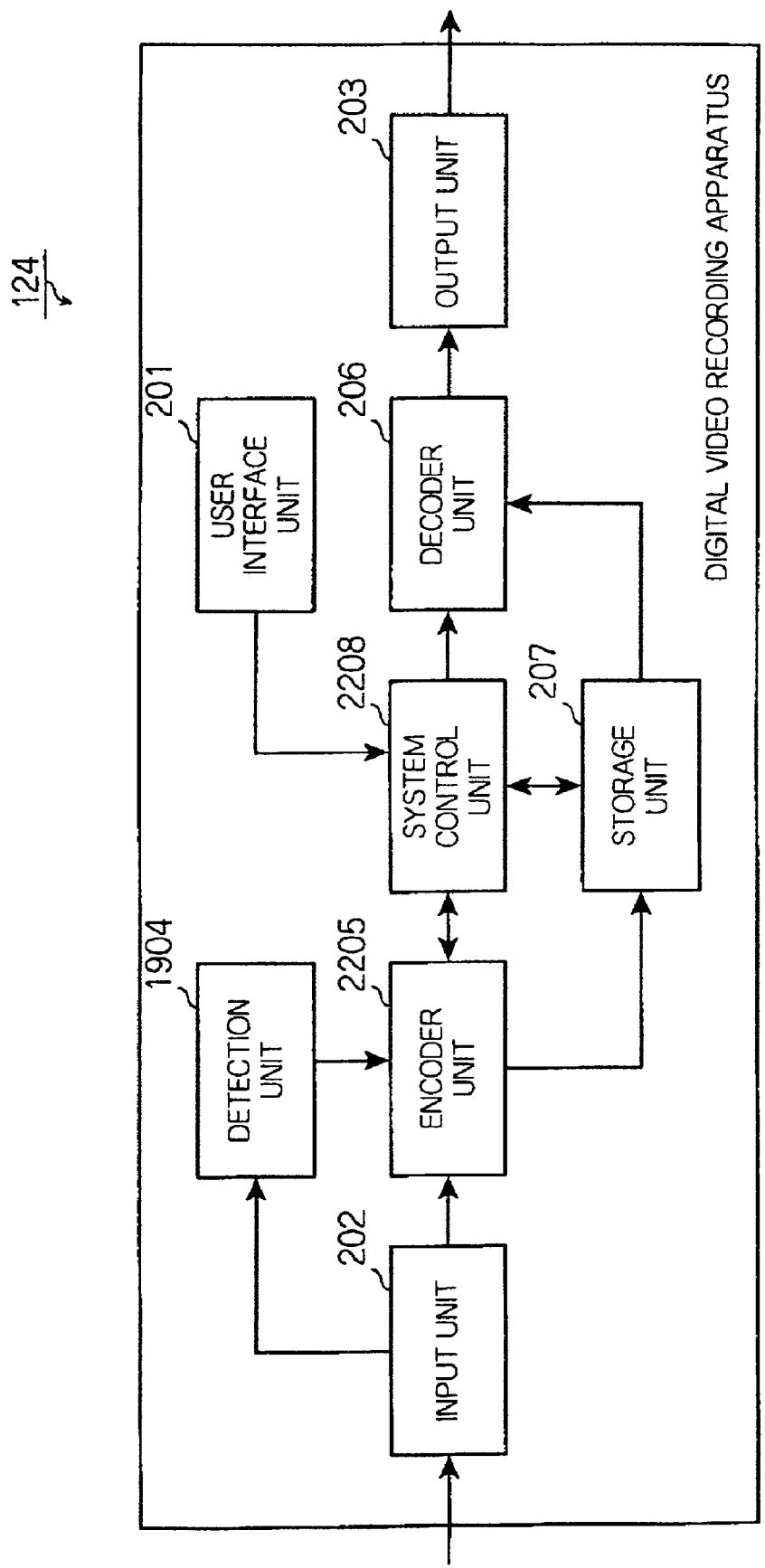
FIG. 24 is a function block drawing of the digital recording apparatus in the sixth embodiment.

FIG. 24 shows function blocks of the digital recording apparatus of the fifth embodiment.

As shown in the figure, a digital video recording apparatus 124, has an encoder unit 2205, and a system control unit 2208 instead the encoder unit 1905, and the system control unit 1908 of the digital video recording apparatus 114.

The encoder unit 2205, receives notification from the detection unit 1904 that a commercial has started, and adds a commercial flag "TRUE" (or "FALSE") to the VOBU information, unlike the encoder unit 1905 which adds commercial start information.

Here, the commercial flag is set to "TRUE" until the encoder unit 2205 receives notification that the commercial has ended, and is set to "FALSE" on receiving the notification. In the same way, the commercial flag is set to "FALSE" until the encoder unit 2205 receives notification that the commercial has finished, and is set to "TRUE" on receiving the notification.

The system control unit 2208 differs from the system control unit 1908 in that it calculates the VOBU start time when the commercial flag in the received VOBU information switches from "FALSE" to "TRUE" (or from "TRUE" to "FALSE"), makes commercial start (or end) information which includes the calculated VOBU start time and text information showing the start (or the end) of the commercial, and adds the commercial start (or end) information to the management information as EPI.

<Operations of the Digital Recording Apparatus 124>

The following explains operations of the digital video recording apparatus 124 with the above-described structure.

<Commercial Cut Recording Function in Skip Mode>

The following explains the commercial cut recording mode (skip mode) of the digital video recording apparatus 124 in the sixth embodiment, assuming the user has selected the skip mode in advance.

Note that procedures that are the same as the commercial cut recording (skip mode) of the fifth embodiment have the same reference numbers. The following concentrates on the procedures of the sixth embodiment that differ from the fifth embodiment.

<Processing of the System Control Unit 2208 When a Commercial Starts>

Figure 25:
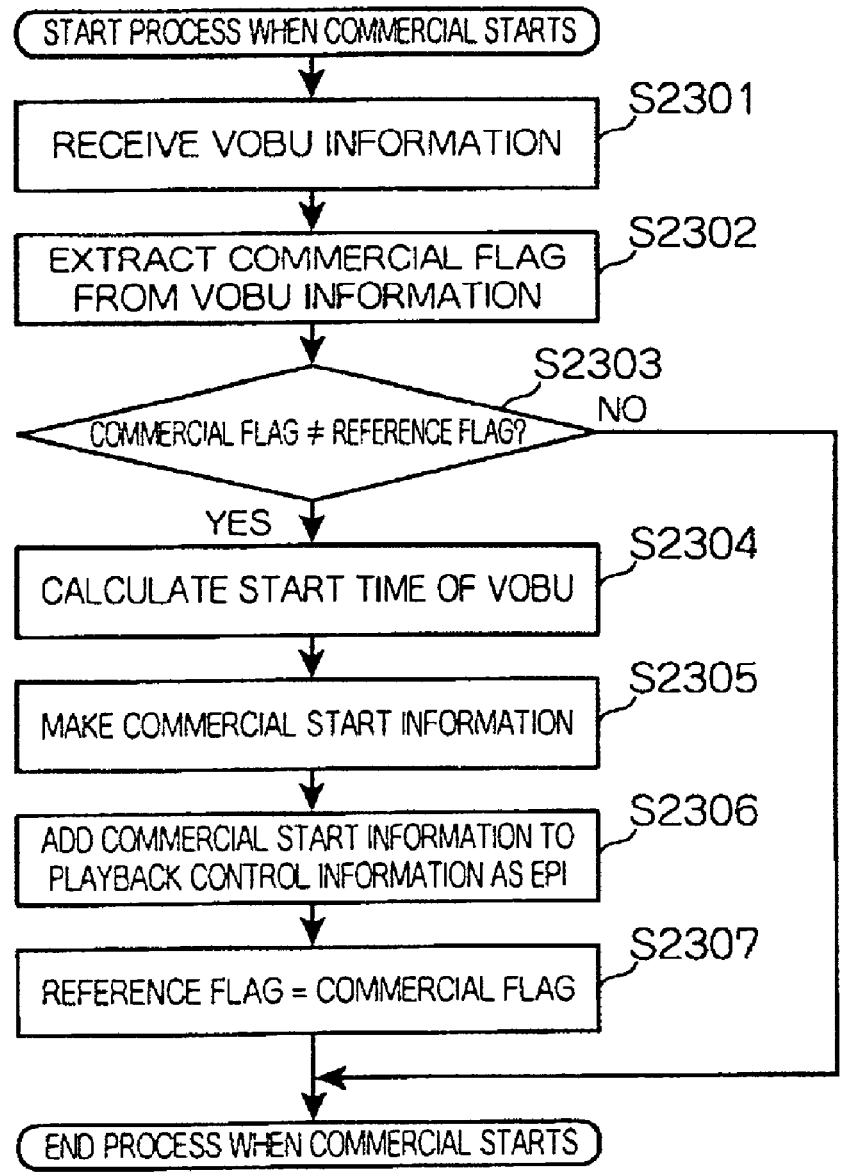
FIG. 25 is a flowchart of the processing of the encoder when a commercial starts in the sixth embodiment.

FIG. 25 is a flowchart showing the processing of the system control unit 2208 when a commercial starts in the sixth embodiment.

As shown in the flowchart, the system control unit 2208 receives VOBU information sent from the encoder unit 2205 each time the encoder unit 2205 makes the VOBU information (step S2301). The system control unit 2208 extracts a commercial flag which is included in the received VOBU information (step S2302), and judges whether the extracted commercial flag is the same as a reference flag (step S2303).

If the result of the judgement is that the commercial flag is not the same as the reference flag, the system control unit 2208 calculates the start time of the VOBU (step S2304), makes commercial start information which includes the calculated VOBU start time and text information showing the start of the commercial (step S2305), and adds the commercial start time to the management information as EPI (step S2306). Then, the system control unit 2208 updates the value of the reference flag to the value of the extracted flag (step S2307).

Note that the system control unit 2208, in the same way as the process at the start of the commercial, at the end of the commercial makes commercial end time information which includes the calculated commercial end time and text information showing the end of the commercial, and adds the commercial end information to the management information as EPI.

<Operation Example of the Commercial Cut Recording Function in Skip Mode>

Figure 26:
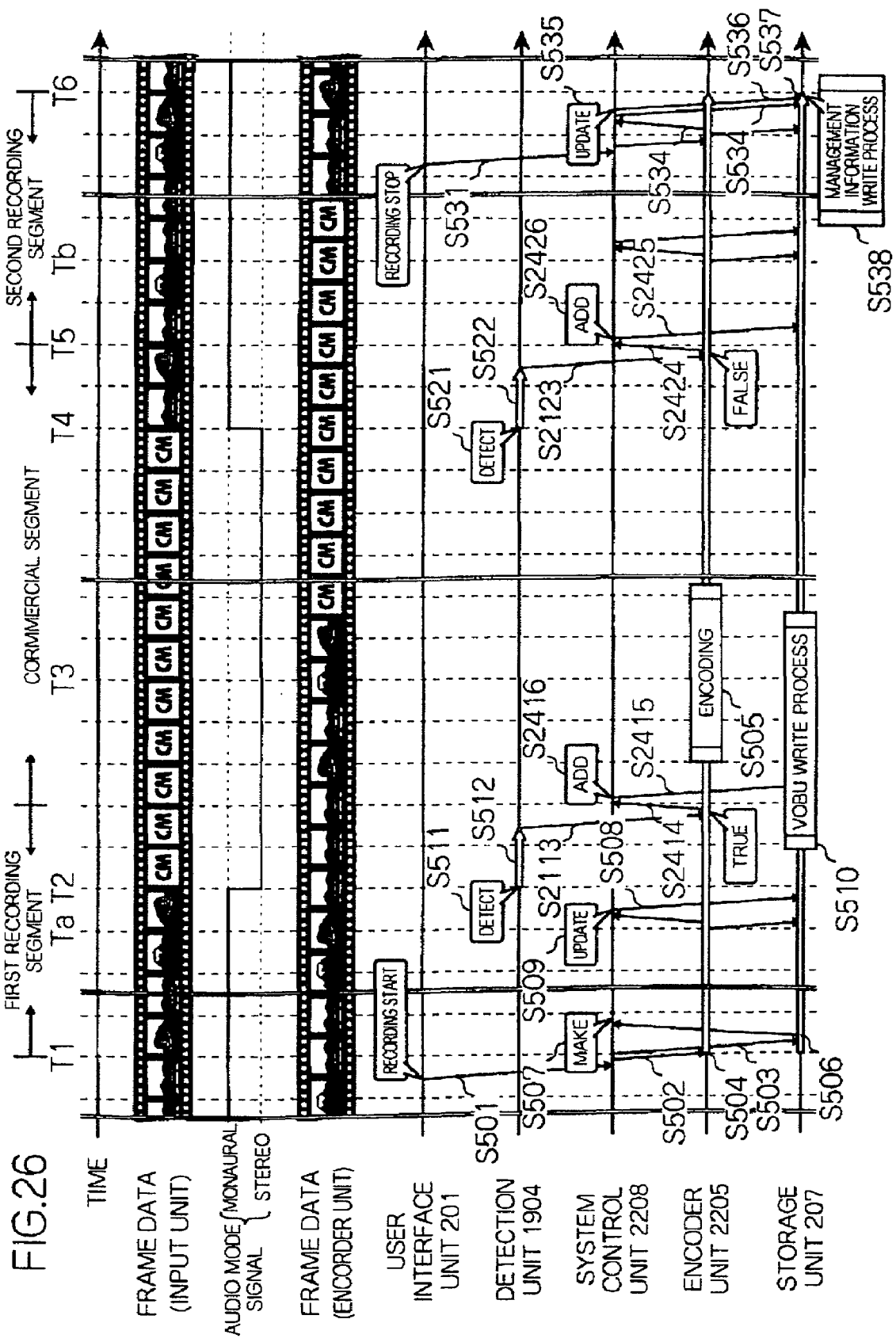
FIG. 26 shows an example of a commercial cut recording sequence in skip mode.

FIG. 26 shows an example of a sequence of the commercial cut recording process in skip mode.

The figure shows, starting from the top, frame data and an audio mode signal received through an antenna, frame data to be encoded, and the constituent features of the digital video recording apparatus 124, In the following a VOB which is generated through the first recording segment, the commercial segment, and the second recording segment will be called VOB#1.

<Start of Recording>

In the sixth embodiment the sequence when recording starts is the same as that in steps S501 to S510 in the first embodiment, so an explanation will be omitted.

<Start of a Commercial>

In the sixth embodiment, the sequence when a commercial starts has steps S2414 to S2416 instead of steps S2114 to S2116 in the fifth embodiment.

The encoder unit 2205 receives notification from thee detection unit 1904 that a commercial has started and adds a commercial flag set to "TRUE" to the VOBU information (step S2414).

The system control unit 2208 receives the VOBU information (the VOBU information which includes the commercial flag) sent from the encoder unit 2205, and gives a VOBU write command to the storage unit 207 (step S2415). In addition, the encoder unit 2208 extracts the commercial flag which is included in the received VOBU information, and judges whether the extracted commercial flag is the same as the reference flag.

<End of the Commercial>

In the sixth embodiment, the sequence when the commercial ends differs from the fifth embodiment in that it has the following steps S2424 to S2426 instead of steps S2124 to S2126.

The encoder unit 2205 receives notification from the detection unit 1904 that the commercial has ended, and adds a commercial flag set to "FALSE" to the VOBU information (step S2424).

The system control unit 2208 receives the VOBU information (which includes the commercial flag) sent from the encoder unit 2205, and gives a VOBU information write instruction to the storage unit 207 (step S2425) Furthermore, the system control unit 2208 extracts the commercial flag included in the sent VOBU information, and judges whether the extracted commercial flag is the same as the reference flag.

If the result of the judgement is that the commercial flag is not the same as the reference flag, the system control unit 2208 calculates the start time of the VOBU based on the received VOBU information. Then the system control unit 2208 makes commercial end information which includes the calculated VOBU start time and text information showing the end of the commercial, adds the commercial end information to the management information as EPI, and updates the reference flag with the extracted flag (step S2426).

<End of Recording>

In the sixth embodiment, the sequence when recording ends is the same as steps S531 to S538, therefore an explanation will be omitted.

Note that in the sequence in the commercial cut recording in skip mode, the management information made by the system control unit 2208 is the same as the management information 1800 shown in the fourth embodiment, so an explanation will be omitted.

In addition, the playback procedure is the same as the playback procedure in the second embodiment, so an explanation will be omitted.

Other

Note that the system control program may be recorded on a computer-readable recording medium such as an optical recording medium (for example, a CD-ROM), a magnetic recording medium (for example, a hard disk), an optical magnetic recording medium (for example an MO), or a semiconductor memory (for example, a ROM), and realized on a computer. Furthermore, the system control program may be recorded through a network on a computer-readable recording medium which is provided in the hardware of a computer, such as a hard disk, and be executed by being read by other computers through a transmission path of the network.

Note that the detection unit 14 and the detection unit 1904 may also monitor a scramble signal, besides a audio mode signal or a copy protect signal, to prevent playback of scrambled video even if the scrambled video is recorded.

Note that text showing the start of a commercial is used as the commercial start information, but a flag showing the start of a commercial (a flag showing the commercial or the program) may be used. In the same way, text information showing the end of a commercial is used as the commercial end information, but a flag showing the end of a commercial (a flag showing the commercial or the program) may be used.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A video data recording apparatus comprising:
a detection unit operable to detect a change in an attribute of input video data;
a recording unit operable to record the video data to a recording medium;
a generating unit operable to generate playback control information which shows a position in the video data at which the change in the attribute was detected;
a control unit operable to control the recording unit so that the recording unit records the playback control information to the recording medium; and
a retaining unit operable to retain lag data which shows a lag time including an amount of time required for the detection unit to detect the change in the attribute and an amount of time required from when the detection unit detects the change in the attribute until the recording unit stops recording;
wherein the detection unit detects a change in the attribute of the input video data from a first attribute to a second attribute and from the second attribute to the first attribute;
wherein the first attribute and the second attribute are defined as one of (a) the first attribute being one of (i) stereo, (ii) monaural, and (iii) multiplex audio data, and the second attribute being one of (i), (ii), and (iii) and being different than the first attribute, and (b) the first attribute permitting copying video data to which a copy protect signal is attached, and the second attribute prohibiting copying of video data to which a copy protect signal is attached;
wherein the playback control information indicates to a video data playback apparatus a playback start point and a playback end point of the video data;
wherein the generating unit generates the playback control information so that the detection position of the change in the attribute from the first attribute to the second attribute is the playback end point;
wherein the recording unit stops recording when the detection unit detects the change from the first attribute to the second attribute; and
wherein the generating unit makes a head of the video data of which recording has stopped the playback start point, and a time which is the lag time subtracted from an end time of the video data of which recording has stopped, the playback end point.

2. The video data recording apparatus of claim 1, wherein the recording unit starts recording new video data when the detection unit detects the change in the attribute from the second attribute to the first attribute.

3. The video recording apparatus of claim 1, wherein the playback control information includes first information which instructs the video data playback apparatus of the playback start point and the playback end point of the video data, and second information which shows the detection position in the video data of the change in the attribute.

4. The video data recording apparatus of claim 3, wherein the second information further includes text data which shows that the change in the attribute at the detection positions shown in the second data is from the first attribute to the second attribute, or is from the second attribute to the first attribute.

5. A video data recording apparatus comprising:
a detection unit operable to detect a change in an attribute of input video data;
a recording unit operable to record the video data to a recording medium;
a generating unit operable to generate playback control information which shows a position in the video data at which the change in the attribute was detected;
a control unit operable to control the recording unit so that the recording unit records the playback control information to the recording medium; and
a retaining unit operable to retain lag data which shows a lag time including an amount of time required for the detection unit to detect the change in the attribute,
wherein the detection unit detects a change in the attribute of the input video data from a first attribute to a second attribute and from the second attribute to the first attribute;
wherein the first attribute and the second attribute are defined as one of (a) the first attribute being one of (i) stereo, (ii) monaural, and (iii) multiplex audio data, and the second attribute being one of (i), (ii), and (iii) and being different than the first attribute, and (b) the first attribute permitting copying video data to which a copy protect signal is attached, and the second attribute prohibiting copying of video data to which a copy protect signal is attached;

wherein the playback control information indicates to a video data playback apparatus a playback start point and a playback end point of the video data;

wherein the generating unit generates the playback control information so that the detection position of the change in the attribute from the first attribute to the second attribute is the playback end point;

wherein the recording unit continues to record video data after the detection unit detects the change in the attribute; and wherein the generating unit makes one of (a) a head of the video data and (b) a detection position where the attribute changes from the second attribute to the first attribute, the playback start point, and, when the change in the attribute is detected by the detection unit, makes a time which is the lag time subtracted from the end time of the video data of which recording has stopped, the playback end point.

6. The video recording apparatus of claim 5, wherein the playback control information includes first information which instructs the video data playback apparatus of the playback start point and the playback end point of the video data, and second information which shows the detection position in the video data of the change in the attribute.

7. The video data recording apparatus of claim 6, wherein the second information further includes text data which shows that the change in the attribute at the detection positions shown in the second data is from the first attribute to the second attribute, or is from the second attribute to the first attribute.

8. A recording method for video data, the method comprising:
a first recording step of recording input video data successively to a recording medium;
a detection step of detecting a change in an attribute of the video data;
a generating step of generating playback control information which shows a position in the video data at which the change in the attribute was detected; and
a second recording step of recording the playback control information in correspondence with the video data, to the recording medium;
wherein the detection step detects a change in the attribute of the input video data from a first attribute to a second attribute and from the second attribute to the first attribute;
wherein the first attribute and the second attribute are defined as one of (a) the first attribute being one of (i) stereo, (ii) monaural, and (iii) multiplex audio data, and the second attribute being one of (i), (ii), and (iii) and being different than the first attribute, and (b) the first attribute permitting copying of video data to which a copy protect signal is attached, and the second attribute prohibiting copying of video data to which a copy protect signal is attached;
wherein the playback control information indicates to a video data playback apparatus a playback start point and a playback end point of the video data;
wherein the generating step generates the playback control information so that the detection position of the change in the attribute from the first attribute to the second attribute is the playback end point;

wherein the first recording step stops recording when the detection step detects the change from the first attribute to the second attribute; and wherein the generating step makes a head of the video data of which recording has stopped the playback start point, and a time which is a lag time subtracted from an end time of the video data of which recording has stopped, the playback end point, the lag time being an amount of time required for the detection step to detect the change in the attribute and an amount of time required from when the detection step detects the change in the attribute until the recording step stops recording.

9. The recording method of claim 8, wherein the first recording step starts recording of new video data when the detection step detects the change in the attribute from the second attribute to the first attribute.

10. The recording method of claim 8, wherein the playback control information includes first information which instructs the video data playback apparatus of the playback start point and the playback end point of the video data, and second information which shows the detection position in the video data of the change in the attribute.

11. The recording method of claim 10, wherein the second information further includes text data which shows that the change in the attribute at the detection positions shown in the second data is from the first attribute to the second attribute, or is from the second attribute to the first attribute.

12. A recording method for video data, the method comprising:
a first recording step of recording input video data successively to a recording medium;
a detection step of detecting a change in an attribute of the video data;
a generating step of generating playback control information which shows a position in the video data at which the change in the attribute was detected; and
a second recording step of recording the playback control information in correspondence with the video data, to the recording medium;
wherein the detection step detects a change in the attribute of the input video data from a first attribute to a second attribute and from the second attribute to the first attribute;
wherein the first attribute and the second attribute are defined as one of (a) the first attribute being one of (i) stereo, (ii) monaural, and (iii) multiplex audio data, and the second attribute being one of (i), (ii), and (iii) and being different than the first attribute, and (b) the first attribute permitting copying of video data to which a copy protect signal is attached, and the second attribute prohibiting copying of video data to which a copy protect signal is attached;
wherein the playback control information indicates to a video data playback apparatus a playback start point and a playback end point of the video data;
wherein the generating step generates the playback control information so that the detection position of the change in the attribute from the first attribute to the second attribute is the playback end point;
the first recording step continues recording of video data after the change in the attribute is detected in the detection step; and the generating step makes one of (a) a head of the video data and (b) a detection position where the attribute changes from the second attribute to the first attribute, the playback start point, and, when the change in the attribute is detected in the detection step, makes a time which is the lag time subtracted from the end time of the video data of which recording has stopped the playback end point, wherein the lag time is an amount of time required for the detection step to detect the change in the attribute.

13. The recording method of claim 12, wherein the playback control information includes first information which instructs the video data playback apparatus of the playback start point and the playback end point of the video data, and second information which shows the detection position in the video data of the change in the attribute.

14. The recording method of claim 13, wherein the second information further includes text data which shows that the change in the attribute at the detection positions shown in the second data is from the first attribute to the second attribute, or is from the second attribute to the first attribute.

* * * * *

UNITED STATES PATENT AND TRADEMARK OFFICE
CERTIFICATE OF CORRECTION

| | |
|---|---|
| PATENT NO. | : 7,123,818 B2 |
| APPLICATION NO. | : 09/891174 |
| DATED | : October 17, 2006 |
| INVENTOR(S) | : Tokuo Nakatani et al. |

Page 1 of 1

It is certified that error appears in the above-identified patent and that said Letters Patent is hereby corrected as shown below:

<u>Column 38,</u>

Between lines 64-65, insert the term --wherein--.

Signed and Sealed this

First Day of May, 2007

JON W. DUDAS
*Director of the United States Patent and Trademark Office*